United States Patent
Moon et al.

(10) Patent No.: US 10,171,949 B2
(45) Date of Patent: Jan. 1, 2019

(54) ELECTRONIC APPARATUS AND OPERATING METHOD THEREOF

(71) Applicant: Samsung Electronics Co., Ltd., Gyeonggi-do (KR)

(72) Inventors: Choonkyoung Moon, Gyeonggi-do (KR); Jangwoo Lee, Seoul (KR); Ja Ok Koo, Gyeonggi-do (KR); Hyunsoo Nah, Seoul (KR); Eunkyung Yoo, Seoul (KR)

(73) Assignee: Samsung Electronics Co., Ltd (KR)

( * ) Notice: Subject to any disclaimer, the term of this patent is extended or adjusted under 35 U.S.C. 154(b) by 2 days.

(21) Appl. No.: 15/482,123

(22) Filed: Apr. 7, 2017

(65) Prior Publication Data
US 2017/0295469 A1  Oct. 12, 2017

(30) Foreign Application Priority Data

Apr. 7, 2016 (KR) .................. 10-2016-0042900

(51) Int. Cl.
| | |
|---|---|
| *H04W 64/00* | (2009.01) |
| *H04W 4/029* | (2018.01) |
| *H04L 12/28* | (2006.01) |
| *H04L 29/08* | (2006.01) |

(52) U.S. Cl.
CPC .......... *H04W 4/029* (2018.02); *H04L 12/282* (2013.01); *H04L 67/12* (2013.01); *H04L 67/18* (2013.01); *H04L 2012/285* (2013.01)

(58) Field of Classification Search
CPC ................................. H04W 4/02; H04L 67/18
USPC .......................................... 455/456.3
See application file for complete search history.

(56) References Cited

U.S. PATENT DOCUMENTS

| | | | |
|---|---|---|---|
| 8,375,118 B2 | 2/2013 | Hao et al. | |
| 8,977,748 B1 | 3/2015 | Mendis | |
| 2004/0143386 A1* | 7/2004 | Yoshihara | G01C 21/34 701/410 |
| 2006/0085177 A1* | 4/2006 | Toyama | G01C 21/26 703/22 |
| 2010/0070334 A1 | 3/2010 | Monteverde | |

(Continued)

FOREIGN PATENT DOCUMENTS

KR  10-1015577  2/2011

OTHER PUBLICATIONS

International Search Report dated Jul. 24, 2017 issued in counterpart application No. PCT/KR2017/003771, 9 pages.

*Primary Examiner* — Joshua Schwartz
(74) *Attorney, Agent, or Firm* — The Farrell Law Firm, P.C.

(57) ABSTRACT

The present disclosure relates to an electronic device and an operating method thereof. The electronic device includes a memory configured to store at least one expected movement path, and a processor configured to confirm a first location of a user, predict a second location on a basis of the first location and a pre-stored at least one expected movement path, and provide an information service providing signal to at least one external device present in the second location. The method includes confirming a first location of a user, predicting a second location on a basis of the first location and a pre-stored at least one expected movement path, and providing an information service providing signal to at least one external device present in the second location.

20 Claims, 20 Drawing Sheets

(56) References Cited

U.S. PATENT DOCUMENTS

2012/0028650 A1 2/2012 Cooper et al.
2015/0025659 A1 1/2015 Bartlett et al.

\* cited by examiner

AM 6~AM 10

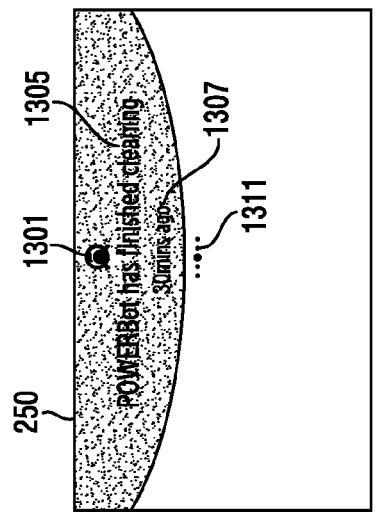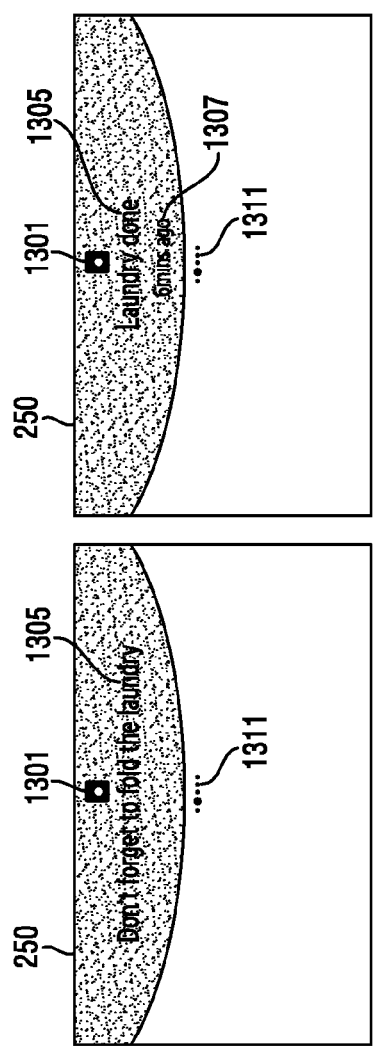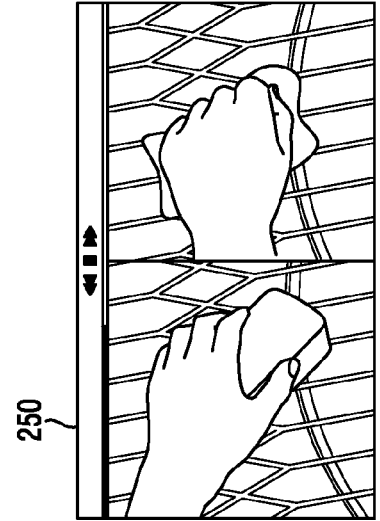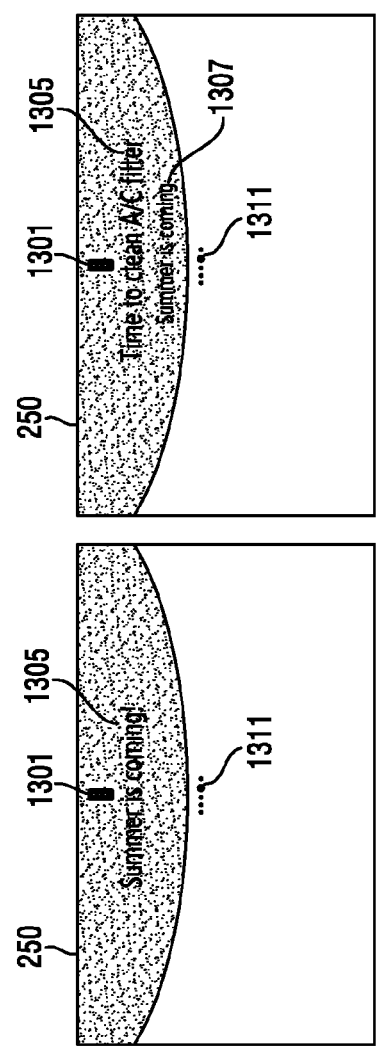

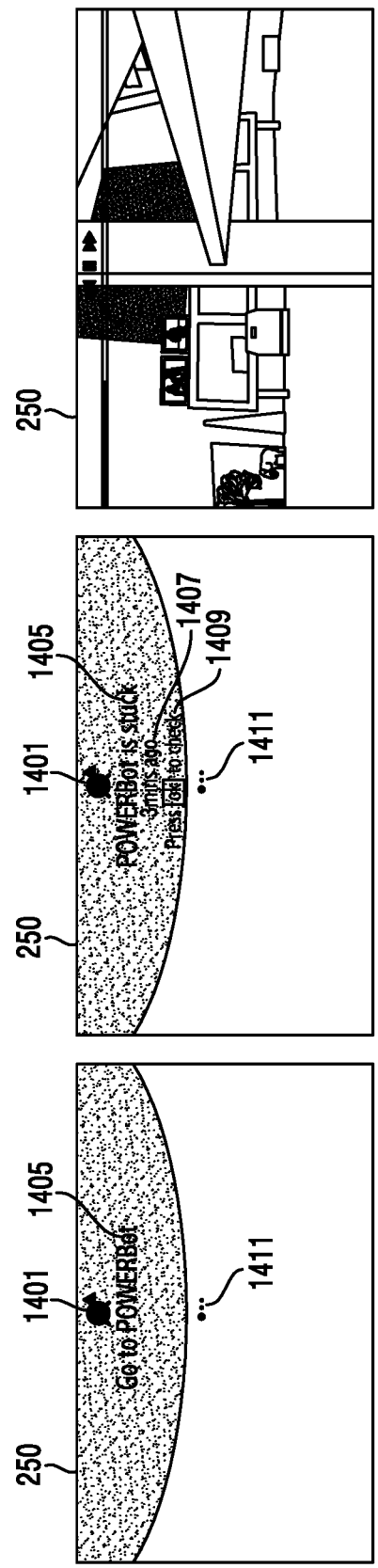

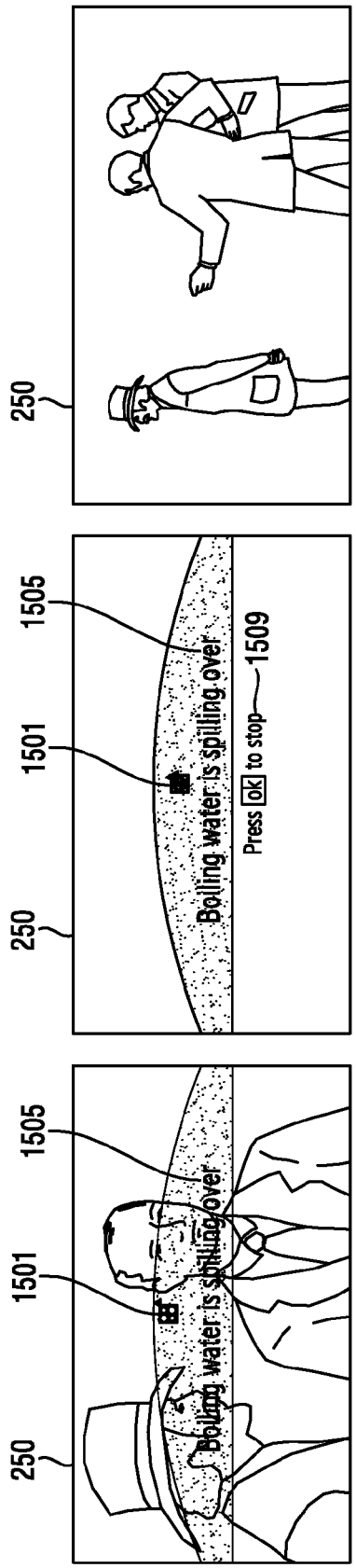

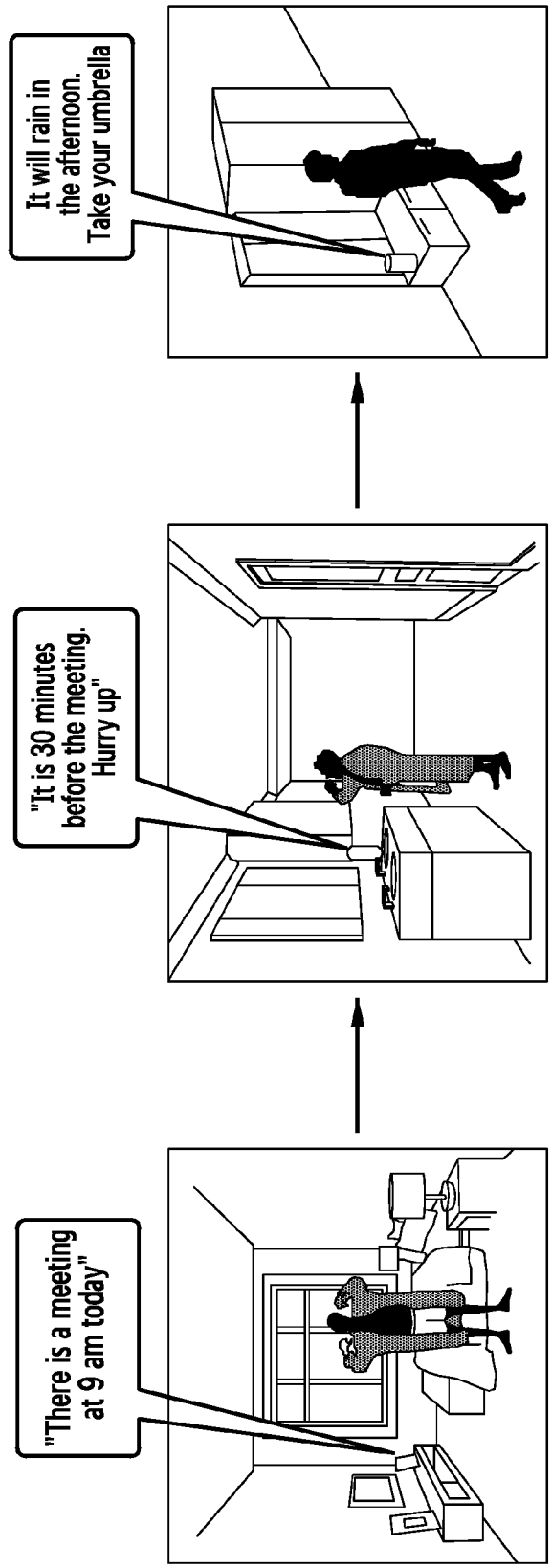

ELECTRONIC APPARATUS AND OPERATING METHOD THEREOF

PRIORITY

This application claims priority under 35 U.S.C. § 119 (a) to a Korean Patent Application filed on Apr. 7, 2016 in the Korean Intellectual Property Office, and assigned Ser. No. 10-2016-0042900, the entire disclosure of which is incorporated herein by reference.

BACKGROUND

1. Field of the Disclosure

The present disclosure relates generally to an electronic device and an operating method thereof, and more particularly, to an electronic device and an operating method thereof for predicting a movement location of a user and delivering information generated in home appliances to at least one electronic device present in the predicted movement location.

2. Description of the Related Art

With the spread of home network and Internet of Things (IoT) technology, the conventional computer-based network environment is gradually expanding to an environment including home appliances using various sub-network technologies. Accordingly, a user may control smart home appliances and items by receiving information generated in the smart home appliances and the items (hereinafter, referred to as home appliances).

Since the information generated in the home appliances is transmitted to an electronic device irrespective of a current location of a user or an expected movement location of the user in the aforementioned home environment, there is a problem in that information delivery is limited.

SUMMARY

An aspect of the present disclosure provides an electronic device capable of predicting a movement location of a user on the basis of a current location or final location of the user and capable of delivering information generated in home appliances to at least one electronic device present in the predicted movement location.

According to an aspect of the present disclosure, a method of operating an electronic device is provided. The method includes confirming a first location of a user, predicting a second location on a basis of the first location and a pre-stored at least one expected movement path, and providing an information service providing signal to at least one external device present in the second location.

According to an aspect of the present disclosure, an electronic device is provided. The electronic device includes a memory configured to store at least one expected movement path, and a processor configured to confirm a first location of a user, predict a second location on a basis of the first location and a pre-stored at least one expected movement path, and provide an information service providing signal to at least one external device present in the second location.

BRIEF DESCRIPTION OF THE DRAWINGS

The above and other aspects, features, and advantages of the present disclosure will be more apparent from the following detailed description, taken in conjunction with the accompanying drawings, in which:

FIGS. 13A, 13B, 13C, 13D, 13E, and 13F illustrate a method of outputting information if user access is detected in an electronic device according to an embodiment of the present disclosure;

FIGS. 14A, 14B, and 14C illustrate a method of outputting information if a user is not detected in an electronic device according to an embodiment of the present disclosure;

FIGS. 15A, 15B, and 15C illustrate a method of outputting information in a state where a display of an electronic device is activated according to an embodiment of the present disclosure;

FIGS. 18, 19A, 19B, 19C, 20A, 20B, and 20C illustrate a method of providing information to a user on a basis of the user's location in an electronic device according to an embodiment of the present disclosure.

DETAILED DESCRIPTION OF EMBODIMENTS OF THE PRESENT DISCLOSURE

Figure 1:
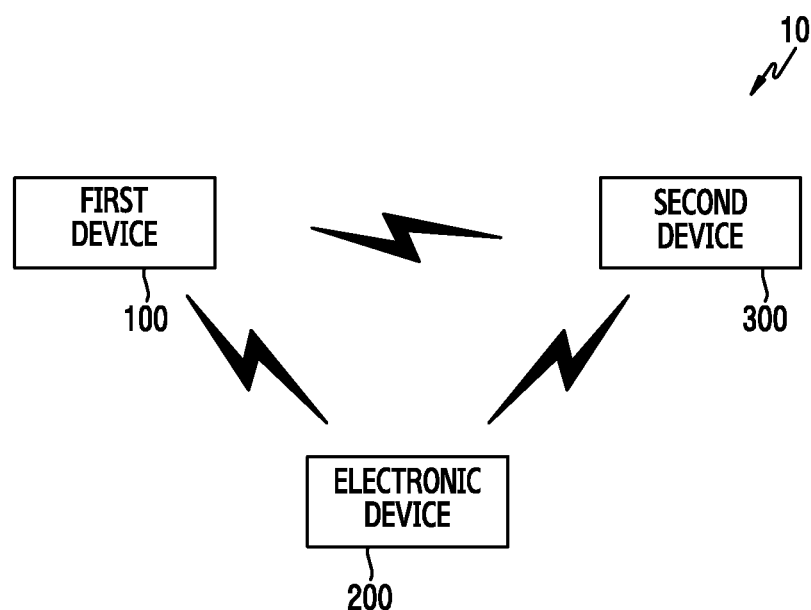
FIG. 1 illustrates a system for operating an electronic device according to an embodiment of the present disclosure.

Hereinafter, various embodiments of the present disclosure are described with reference to the accompanying drawings. It should be understood, however, that it is not intended to limit the various embodiments of the present disclosure to the particular form disclosed, but, on the contrary, it is intended to cover all modifications, equivalents, and alternatives falling within the scope and spirit of the various embodiments of the present disclosure. Like reference numerals denote like components throughout the accompanying drawings. A singular expression includes a plural concept unless there is a contextually distinctive difference therebetween. In the present disclosure, an expression "A or B", "A and/or B", or the like may include all possible combinations of items enumerated together. Although expressions such as "$1^{st}$", "$2^{nd}$", "first", and "second" may be used to express corresponding elements, it is not intended to limit the corresponding elements. When a certain (e.g., $1^{st}$) element is mentioned as being "operatively or communicatively coupled with/to" or "connected to" a different (e.g., $2^{nd}$) element, the certain element is directly coupled with/to another element or may be coupled with/to the different element via another (e.g., $3^{rd}$) element.

An expression "configured to" used in the present disclosure may be interchangeably used with, for example, "suitable for", "having the capacity to", "adapted to", "made to", "capable of", or "designed to" in a hardware or software manner according to a situation. In a certain situation, an expression "a device configured to" may imply that the device is "capable of" together with other devices or components. For example, "a processor configured to perform A, B, and C" may imply a dedicated processor (e.g., an embedded processor) for performing a corresponding operation or a general-purpose processor (e.g., a central processing unit (CPU) or an application processor) capable of performing corresponding operations by executing one or more software programs stored in a memory device.

An electronic device according to various embodiments of the present disclosure may include, for example, at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a moving picture experts group (MPEG-1) audio layer 3 (MP3) player, a mobile medical device, a camera, and a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit). According to certain embodiments, the electronic device may include, for example, at least one of a television (TV), a digital video disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync®, Apple TV®, or Google TV™), a game console (e.g., Xbox®, PlayStation®), an electronic dictionary, an electronic key, a camcorder, and an electronic picture frame.

According to embodiments, an electronic device may include at least one of various medical devices (e.g., various portable medical measuring devices (e.g., a blood sugar measuring device, a heart rate measuring device, a blood pressure measuring device, a body temperature measuring device, etc.), magnetic resonance angiography (MRA), magnetic resonance imaging (MRI), computed tomography (CT), imaging equipment, an ultrasonic instrument, etc.)), a navigation device, a global position system (GPS) receiver, an event data recorder (EDR), a flight data recorder (FDR), a car infotainment device, electronic equipment for a ship (e.g., a vessel navigation device, a gyro compass, etc.), avionics, a security device, a car head unit, an industrial or domestic robot, a drone, an automated teller machine (ATM) of financial institutions, point of sales (POS) device of shops, and an Internet of Things (IoT) device (e.g., a light bulb, various sensors, an electric or gas meter, a sprinkler device, a fire alarm, a thermostat, a streetlamp, a toaster, fitness equipment, a hot water tank, a heater, a boiler, etc.). According to certain embodiments, an electronic device may include at least one of one part of furniture, buildings/constructions or cars, an electronic board, an electronic signature receiving device, a projector, and various measurement machines (e.g., water supply, electricity, gas, propagation measurement machine, etc.). An electronic device according to various embodiments may be flexible, or may be a combination of two or more of the aforementioned various devices. An electronic device according to an embodiment of the present disclosure is not intended to be limited to the aforementioned devices. The term "user" used in the present disclosure may refer to a person who uses an electronic device or a device (e.g., an artificial intelligence (AI) type electronic device) which uses the electronic device.

FIG. 1 illustrates a system for operating an electronic device according to an embodiment of the present disclosure.

Referring to FIG. 1, a system 10 may include a first device 100, an electronic device 200, and a second device 300. Each of the first device 100 and the second device 300 may communicate with the electronic device 200. The electronic device 200 may be a device provided in an indoor area together with the first device 100 and the second device 300, and may be provided in an external area in a form of a cloud server or the like. The electronic device 200 may receive an information service providing signal from a home appliance, a sensor, and a mobile device (hereinafter collectively referred to as a home appliance) provided in an indoor area. In this case, the home appliance is capable of communicating with the electronic device 200 through communication such as Bluetooth, Bluetooth low energy (BLE), or the like. Upon receiving an information service providing signal from a home appliance, the electronic device 200 may perform a function corresponding to the information service providing signal in the electronic device 200. The electronic device 200 may provide the information service providing signal to at least one of the first device 100 and the second device so as to perform the function corresponding to the information service providing signal in at least one of the first device 100 and the second device 300. In addition, the electronic device 200 may confirm information on a state, user situation, or the like of devices confirmed in an indoor area from sensing information sensed in all devices (the first device 100, the second device 200, the home appliance, etc.) provided in the indoor area. The electronic device 200 may combine or integrate the confirmed information and situation to generate an information service providing signal. An information service providing signal may be a signal for information on a device and a user, a function of the device and a service for the device, a service related to an outdoor environment (e.g., weather, etc.), a service related to a user state (e.g., schedule, etc.), or the like.

In addition, the first device 100 and the second device 300 may include a user detection sensor to detect the user. The first device 100 and the second device 300 may transmit sensing information to the electronic device 200. The first device 100 and the second device 300 may include a display. The first device 100 and the second device 300 may perform a function corresponding to an information service providing signal received from the electronic device 200. The first device 100 and the second device 300 may control a speaker to output a message or the like corresponding to an information service providing signal as sound data. The first device 100 and the second device 300 may control a display to output a message or the like corresponding to an information service providing signal as image data. The first device 100 or the second device 300 may control a motor or the like to perform an operation corresponding to an information service providing signal. In this case, the operation of the first device 100 or the second device 300 may be an operation of rotating a display, moving the first device 100 or the second device 300, or the like.

The first device 100 and the second device 300 may set a standby state to a first standby state or a second standby state by the electronic device 200. In this case, the first standby state may indicate a state in which only a user detection sensor provided in the first device 100 and the second device 300 and a communication module provided in the first device 100 and the second device 300 are activated. The second standby state may indicate a state in which a user detection sensor provided in the first device 100 and the second device 300, a communication module provided in the first device 100 and the second device 300, and a processor provided in the first device 100 and the second device 300 are activated.

The electronic device 200 may perform wireless communication with the first device 100 and the second device 300. The electronic device 200 may receive sensing information related to whether a user is detected from the first device 100 and the second device 300. The electronic device 200 may use received sensing information to generate a relational model or probability model among the electronics device 200, the first device 100, and the second device 300 located in an indoor area. The relational model or probability model may be a model capable of predicting a user's movement path on a basis of a current location or a final location of the user.

The electronic device 200 may confirm a signal received from a home appliance located in an indoor area, a signal related to information on a device and a user, a signal related to a function of the device and a service for the device, a signal for a service related to an outdoor environment (e.g., weather, etc.), a service for a service related to a user state (e.g., schedule, etc.), or the like. The electronic device 200 may provide an information service providing signal to at least one of the first device 100 and the second device 300 present in a current location of a user if an aforementioned signal (e.g., an information service providing signal) is generated. The electronic device 200 may confirm an expected movement path of a user by using a final location of the user and a generated relational model or probability model if an information service providing signal is generated. The electronic device 200 may set a standby state of at least one of the first device 100 and second device 300 present in a location corresponding to a confirmed expected movement path to the second standby state, and may provide an information service providing signal.

Figure 2:
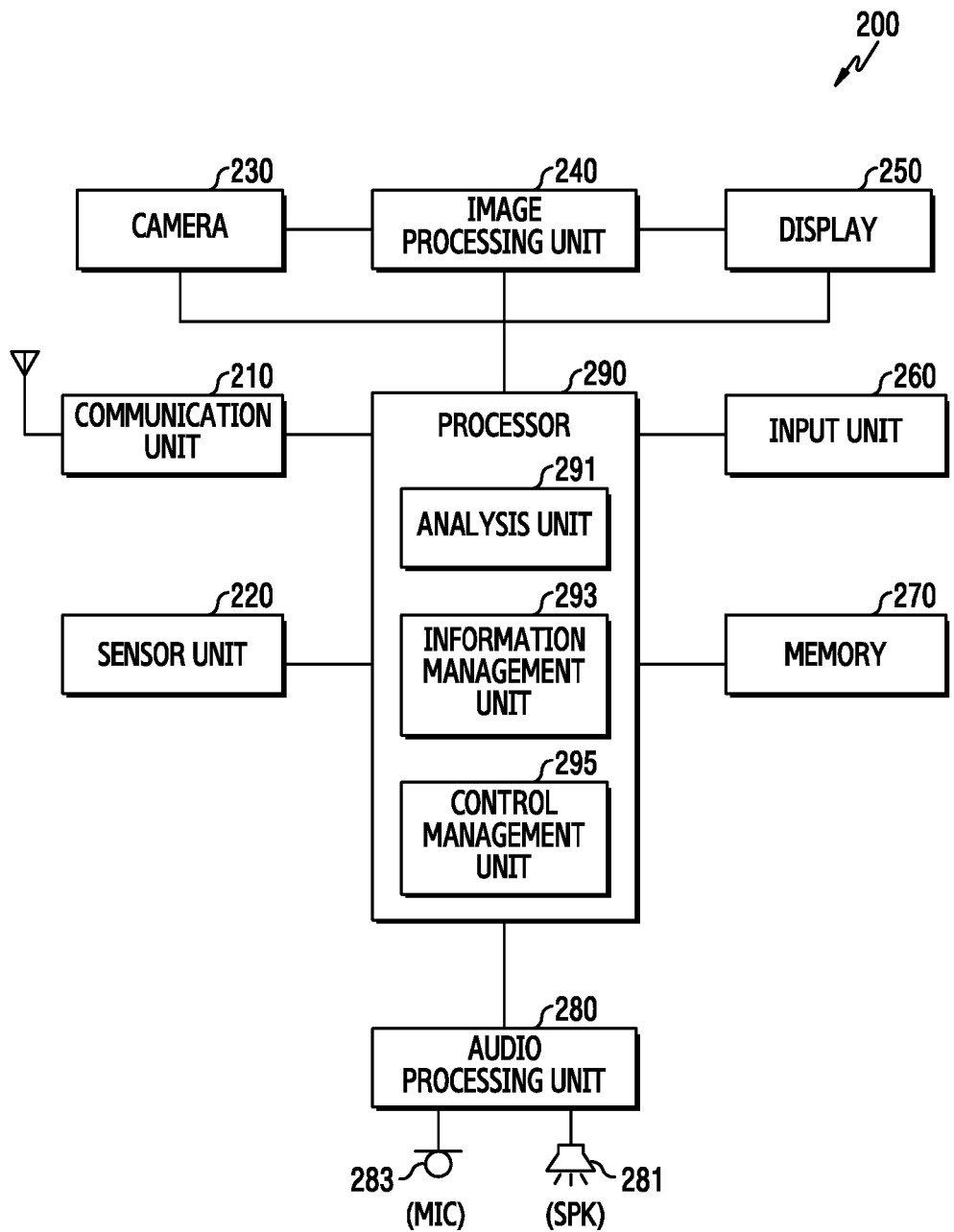
FIG. 2 illustrates a primary structure of an electronic device according to an embodiment of the present disclosure.

FIG. 2 illustrates a primary structure of an electronic device according to an embodiment of the present disclosure.

Referring to FIG. 2, the electronic device 200 according to the present disclosure may include a communication unit 210, a sensor unit 220, a camera 230, an image processing unit 240, a display 250, an input unit 260, a memory 270, an audio processing unit 280, and a processor 290.

The communication unit 210 may communicate with an external device such as the first device 100, the second device 300, a home appliance located in an indoor area, and a user's portable device, wearable device, or the like. In this case, the communication unit 210 may communicate with the external device by using various communication schemes. The communication unit 210 may perform at least one of a wireless communication and a wired communication. The communication unit 210 may include long term evolution (LTE), wideband code division multiple access (WCDMA), global system for mobile communications (GSM), wireless fidelity (Wi-Fi), Bluetooth, near field communication (NFC), BLE, and infrared (IR).

The sensor unit 220 may detect a user access or an operational state of the electronic device 200, and may convert detected information into an electrical signal. For example, the sensor unit 220 may include a user detection sensor, a gesture sensor, an illumination sensor, or the like. The sensor unit 220 may include a control circuit for controlling at least one sensor. The sensor unit 220 may provide the processor 290 with sensing information sensed by at least one sensor.

The camera 230 may be disposed to a certain location of the electronic device 200 to obtain image data of a subject. For this, the camera 230 may receive an optical signal. The camera 230 may generate image data from the optical signal. The camera 230 may include a camera sensor and a signal converter. A camera sensor may be included in the sensor unit 220. A camera sensor may convert an optical signal into an electrical image signal. A signal converter may convert an analog image signal into a digital image data.

The image processing unit 240 processes image data. The image processing unit 240 may process image data in a unit of frames to output the image data in association with a feature and a size of the display 250. The image processing unit 240 may compress image data in a determined manner or may restore the compressed image data to its original image data. The image processing unit 240 may provide image data processed in a unit of frames to the processor 290.

The display 250 may output display data according to an operation of the electronic device 200. The display 250 may include a liquid crystal display (LCD), a light emitting diode (LED) display, an organic LED (OLED) display, a micro electro mechanical system (MEMS) display, and an electronic paper display. The display 250 may be implemented in a touch screen by being coupled to the input unit 260.

The input unit 260 may generate input data in response to a user input of the electronic device 200. The input unit 260 may include at least one input means. The input unit 260 may include a key pad, a dome switch, a touch panel, a jog and shuttle device, a sensor, a touch key, a menu button, or the like.

The memory 270 may store operational programs of the electronic device 200. The memory 270 may store a relational model or a probability model generated in the processor 290 with respect to the electronic device 200, the first device 100, and the second device 300 located in an indoor area. The memory 270 may store pairing information for communication with external devices. For this, the memory 270 may include, for example, an internal memory or an external memory. An internal memory may include, for example, at least one of a volatile memory (e.g., a dynamic random access memory (DRAM), a static RAM (SRAM), a synchronous DRAM (SDRAM), etc.) and a non-volatile memory (e.g., a one-time programmable read only memory (OTPROM), a programmable ROM (PROM), an erasable PROM (EPROM), an electrically erasable PROM (EEPROM), a mask ROM, a flash ROM, a flash memory (e.g., a NAND flash memory, a NOR flash memory, etc.), a hard drive, or a solid state drive (SSD)).

An external memory may include a flash drive, for example, a compact flash (CF) drive, a secure digital (SD) memory card, a micro secure digital (Micro-SD) memory card, a mini secure digital (Mini-SD) memory card, an extreme Digital (xD) memory card, a memory stick, or the like. The external memory may be operatively and/or physically connected to an electronic device via various interfaces.

The audio processing unit 280 may process an audio signal. The audio processing unit 280 may include a speaker (SPK) 281 and a microphone (MIC) 283. The audio processing unit 280 may reproduce the audio signal output from the processor 290 through the speaker. The audio processing unit 280 may deliver the audio signal generated in the microphone to the processor 290.

The processor 290 may generate a relational model or a probability model among the electronic device 200, the first device 100, and the second device 300 by using sensing information which is related to whether a user is detected and which is received from the first device 100 and the second device 300 provided in an indoor area. The processor 290 may obtain an information service providing signal or the like. If the information service providing signal is obtained, the processor 290 may confirm a current location or a final location of a user.

The processor 290 may confirm a current location of a user on a basis of sensing information regarding user detection and obtained from any one of the sensor unit 220, the first device 100, and the second device 300. If the current location of a user is not confirmed, the processor 290 may confirm a most recently detected location as a final location of the user. The processor 290 may confirm where a current location or a final location of a user is located on the user's expected movement path predicted from a relational model or a probability model. The processor 290 may use an expected movement path to confirm a location to which a user may move.

The processor 290 may set a standby state of a device (e.g., the first device 100), which is present in a confirmed location to which a user may move, to the second standby state. The processor 290 may set a standby state of a device (e.g., the second device 300) other than the first device 100, which is present in a location to which a user may move, to the first standby state among devices provided in an indoor area. The processor 290 may provide information service providing signal to the first device 100. In this case, the processor 290 may include an analysis unit 291, an information management unit 293, and a control management unit 295. Operations of the analysis unit 291, the information management unit 293, and the control management unit 295 according to the present disclosure are described below in greater detail with reference to FIG. 3.

If the electronic device 200 is a TV, the processor 290 may receive a broadcast signal from a set-top box and output the broadcast signal to the display 250. If the electronic device 200 includes a remote control, the processor 290 may receive a user input signal from the remote control. Further, the electronic device 200 may be a server provided in an indoor area. In this case, the electronic device 200 may not include the display 250.

Figure 3:
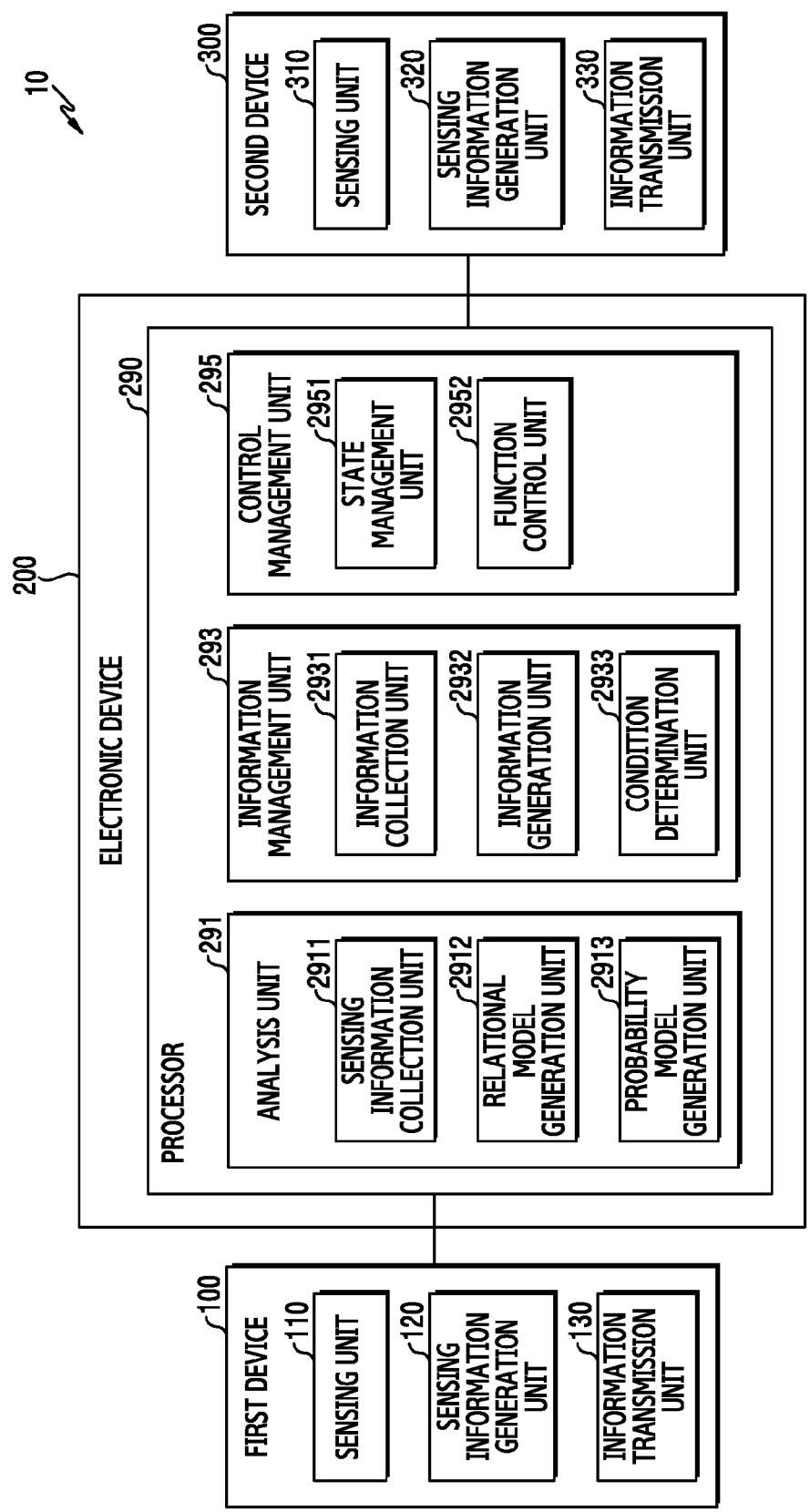
FIG. 3 illustrates a system for operating an electronic device according to an embodiment of the present disclosure.

FIG. 3 illustrates a system for operating an electronic device according to an embodiment of the present disclosure.

Referring to FIG. 3, the system 10 may include the first device 100, the electronic device 200, and the second device 300.

The first device 100 may be provided in an indoor area and may communicate with the electronic device 200. The first device 100 may detect a user, and may provide the electronic device 200 with sensing information related to detecting the user. The first device 100 may set a standby state to one of a first standby state and a second standby state under control of the electronic device 200. In this case, the first device 100 may include a sensing unit 110, a sensing information generation unit 120, and an information transmission unit 130. In addition, if the first sensing device 100 is set to the second standby state, the first device 100 may perform a function corresponding to an information service providing signal received from the electronic device 200. In this case, the function corresponding to the information service providing signal may be as follows. The first device 100 may control a display to output a message or the like corresponding to the information service providing signal as image data. The first device 100 may control a speaker to output a message or the like corresponding to the information service providing signal as sound data. The first device 100 may control a motor or the like to perform an operation corresponding to the information service providing signal.

The sensing unit 110 may detect a user access or detect an operational state of the first device 100, and may convert detected information into an electrical signal. For example, the sensing unit 110 may include a user detection sensor. The sensing unit 110 may include a control circuit for controlling at least one sensor. The sensing unit 110 may provide the sensing information generation unit 120 with sensing information sensed from at least one sensor.

The sensing information generation unit 120 may confirm a user access and a user detection time on a basis of sensing data received from the sensing unit 110. The sensing information generation unit 120 may generate sensing information based on whether a user is detected, and, if so, a confirmed detection time, and may provide the sensing information to the information transmission unit 130. The information transmission unit 130 may transmit the sensing information generated in the sensing information generation unit 120 to the electronic device 200.

The processor 290 included in the electronic device 200 may include the analysis unit 291, the information management unit 293 and the control management unit 295. The analysis unit 291 may include a sensing information collection unit 2911, a relational model generation unit 2912, and a probability model generation unit 2913. The information management unit 293 may include an information collection unit 2931, an information generation unit 2932, and a condition determination unit 2933. The control management unit 295 may include a state management unit 2951 and a function control unit 2952.

The sensing information collection unit 2911 may collect sensing information from the first device 100 and the second device 300. The sensing information collection unit 2911 may confirm a location and a time at which a user is detected from the sensing information and provide the location and the time to the relational model generation unit 2912 and the probability model generation unit 2913. The relational model generation unit 2912 may confirm a positional relation of the electronic device 200, the first device 100, and the second device 300 on a basis of a time at which a user is detected in the sensor unit 220, the first device 100, and the second device 300. The relational model generation unit 2912 may generate a relational model of the electronic device 200, the first device 100, and the second device 300 on a basis of a confirmed positional relation. This is described below in greater detail with reference to FIGS. 5, 6A, 6B, and 6C. The probability model generation unit 2913 may accumulate a user's movement to generate a probability model. The probability model may be a model for predicting a user's movement location on a basis of a current location or a final location of the user, or for predicting the user's behavior. A method of generating a probability model for the electronic device 200, the first device 100, and the second device 300 is described below in greater detail with reference to FIGS. 7A, 7B, and 7C.

The information collection unit 2931 may collect information for generating an information service providing signal. The information collecting unit 2931 may collect information including an operational state of a home appliance provided in an indoor area, a time at which a user operates the home appliance while moving in the indoor area, certain functions executed in the home appliance according to the user's input, information combining or integrating information or situations confirmed in the home appliance, and the user's schedule stored in a portable device or wearable device of the user, and may provide the collected information to the information generation unit 2932. The information generation unit 2932 may generate an information service providing signal by using information provided from the information collecting unit 2931, and may set a priority thereof. For example, the information generation unit 2932 may generate an information service providing signal indicating an operational state in which water is flooded in an induction range provided in an indoor area, and may set a priority thereof. The information generation unit 2932 may generate an information service providing signal indicating a time at which a user starts listening to music while filling a tub with water, and may set a priority thereof. The information generation unit 2932 may generate an information service providing signal indicating a schedule stored in a portable device or wearable device of a user, and may set a priority thereof. In this case, the schedule may be a schedule stored in the portable device or wearable device of the user, and may be a schedule stored by being input by the user.

The information generation unit 2932 may classify an information service providing signal into a user call mode, a user access mode, and a user emergency mode according to a priority of the information service providing signal. The user call mode may be a mode in which devices corresponding to an expected movement path of a user are sequentially set to the second standby state, and functions corresponding to an information service providing signal may be sequentially performed with a predetermined time interval to call the user. The user access mode may be a mode in which a device corresponding to a location to which it is predicted to move immediately from a current location or a final location among devices corresponding to a predicted movement path of a user is set to the second standby state, and a function corresponding to an information service providing signal may be performed if the user is detected by the device which is set to the second standby state. The user emergency mode may be a mode in which a function corresponding to an information service providing signal may be performed simultaneously in a device corresponding to a current location and a device corresponding to an expected movement path of a user. In addition, the mode for the information service providing signal may be changed depending on a time and situation of generating an information service providing signal. If it is detected that an information service providing signal is generated in the information generation unit 2932, the condition determination unit 2933 may determine a time of providing the information service providing signal according to a mode of the information service providing signal.

The state management unit 2951 may set the standby state of the electronic device 200, the first device 100, and the second device 300 on a basis of a current location or a final location of a user and a relational model or a probability model. The state management unit 2951 may deliver a control signal for setting the standby state of the first device 100 and the second device 300 to the first device 100 and the second device 300 through the communication unit 210. According to an embodiment, if an information service providing signal is in the user call mode, the state management unit 2951 may sequentially set the standby state of the first device 100 and the second device 300, which are present in all locations where a user is predicted to move from a current location or a final location, to the second standby state. The state management unit 2951 may set the standby state of a device, which is present in a location where a user is not predicted to move from a current location or a final location, to the first standby state. If the state management unit 2951 sequentially sets the standby state of the first device 100 and the second device 300 to the second standby state, the function control unit 2952 may provide an information service providing signal to the first device 100 and the second device 300 with a certain time interval.

According to an embodiment, if an information service providing signal is in the user access mode, the state management unit 2951 may set the standby state of the first device 100, which is present in a location where a user is predicted to move immediately from a current location or a final location, to the second standby state. The state management unit 2951 may set the standby state of the second device 300, which is present in a location where a user is not predicted to move immediately from a current location or a final location, to the first standby state. The function control unit 2952 may provide an information service providing signal to the first device 100 if it is confirmed that a user is detected in the first device 100.

According to an embodiment, if an information service providing signal is in the user emergency mode, the state management unit 2951 may provide the information service providing signal to the electronic device 200 corresponding to a current location or a final location of a user and to the first device 100 and the second device 300 which are present in all locations where the user is predicted to move from the current location or the final location. Accordingly, upon generating the information service providing signal which is in the user emergency mode, a function corresponding to the information service providing signal may be performed simultaneously in the first device 100, electronic device 200, and second device 300 which are located in an indoor area. The function control unit 2952 may perform a function corresponding to an information service providing signal by using the display 250, a speaker, a motor, or the like if the electronic device 200 is present in a current or a final location of a user.

The function control unit 2952 may control the display 250 to output audiovisual content corresponding to an information service providing signal. The function control unit 2952 may control a speaker to output a sound corresponding to an information service providing signal. The function control unit 2952 may control a motor or the like to perform a function corresponding to an information service providing signal. For example, the function control unit 2952 may perform a function of rotating a direction of the display 250 according to an information service providing signal, or moving a location of the electronic device 200 by operating the electronic device 200.

The second device 300 may perform an operation similar to that of the first device 100. The second device 300 may include a sensing unit 310, a sensing information generation unit 320, and an information transmission unit 330. Since the sensing unit 310, the sensing information generation unit 320, and the information transmission unit 330 are the same as the sensing unit 110, the sensing information generation unit 120, and the information transmission unit 130 in the sensing unit 110 described above, respectively, descriptions of the sensing unit 310, the sensing information generation unit 320, and the information transmission unit 330 are omitted.

Figure 4:
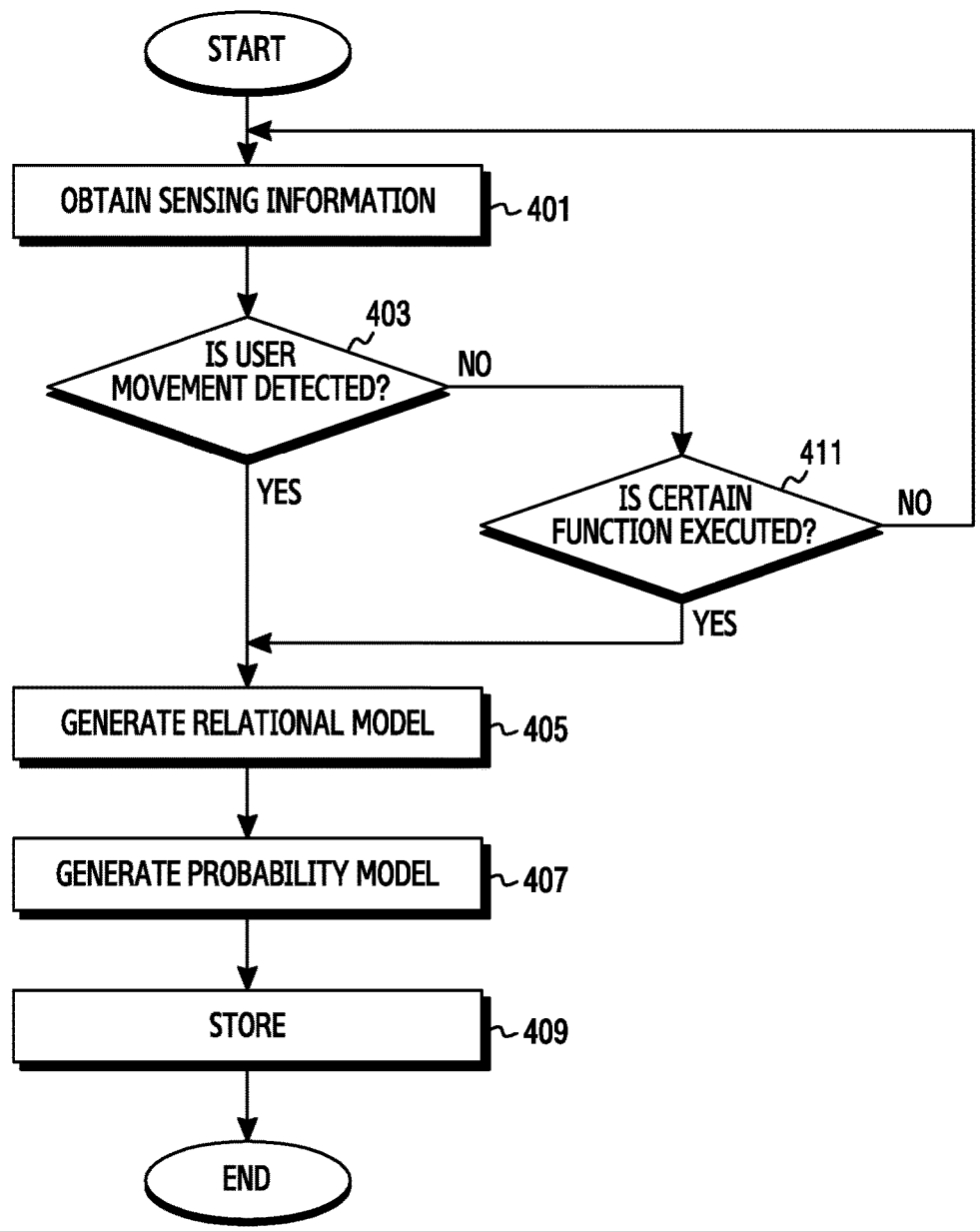
FIG. 4 illustrates a method of generating a model for at least one device in an indoor area according to an embodiment of the present disclosure.

FIG. 4 illustrates a method of generating a model for at least one device in an indoor area according to an embodiment of the present disclosure.

Referring to FIG. 4, in step 401, the processor 290 may obtain sensing information on a real time basis or periodically from the sensor unit 220 provided in the electronic device 200 or at least one device (e.g., the first device 100 or the second device 300) located in an indoor area. In step 403, the processor 290 may detect a movement of a user by using the obtained sensing information. If it is confirmed in step 403 that movement of the user is detected, the processor 290 may perform step 405. If it is not confirmed in step 403 that movement of the user is detected, the processor 290 may perform step 411.

In step 405, the processor 290 may generate a relational model for the electronic device 200 and a device located in an indoor area. According to one embodiment, the processor 290 may confirm that the user is detected from any one of the electronic device 200 and the device located in the indoor area, and that the user is detected from another device within a certain time. If the user is detected in different devices within a certain time, the processor 290 may confirm that the different devices in which the user is detected have a positional relation. The processor 290 may confirm the positional relation between the devices located in the indoor area by the method described above. The processor 290 may confirm the positional relation to generate a relational model of the devices located in the indoor area, and may perform step 407. A method of generating the relational model by using the electronic device 200 and the device located in the indoor area is described below in greater detail with reference to FIGS. 5, 6A, 6B, and 6C.

In step 407, the processor 290 may generate a probability model by using a user's movement path, the electronic device 200, and the device located in the indoor area. According to an embodiment, the processor 290 may accumulate the user's movement path depending on an order by which the user is detected from any one of the electronic device 200 and the device located in the indoor area. The processor 290 may predict a probability of moving from another location from the device in which the user is detected. The processor 290 may predict a probability of movement per time by confirming each of a time and a day of week at which the user is detected. The processor 290 may generate a probability model of the devices located in the indoor area by using the predicted movement probability, and may perform step 409. A method of generating the probability model by using the electronic device 200 and the device located in the indoor area is described below in greater detail with reference to FIGS. 7A, 7B, and 7C.

In step 409, the processor 290 may store in the memory 270 the relational model or probability model generated in step 405 and step 407, respectively. In this case, the processor 290 may perform any one of steps 405 and 407, and the order of steps 405 and 407 may be changed. In addition, the processor 290 may store the generated relational model and probability model in an external server or the like.

If movement of the user is not detected in step 403, the processor 290 may perform step 411. In step 411, the processor 290 may perform step 405 upon confirmation that a certain function is executed, and may return to step 401 if the certain function is not executed. In this case, the certain function may be a function in which at least one of the electronic device 200 and the device located in the indoor area is activated by a user's input, or is manipulated by the user's input. In step 405, the processor 290 may generate a relational model on the basis of an order in which the certain function is executed in the device located in the indoor area. In step 407, the processor 290 may generate a probability model according to the user's movement detected in the activated device located in the indoor area.

Figure 5:
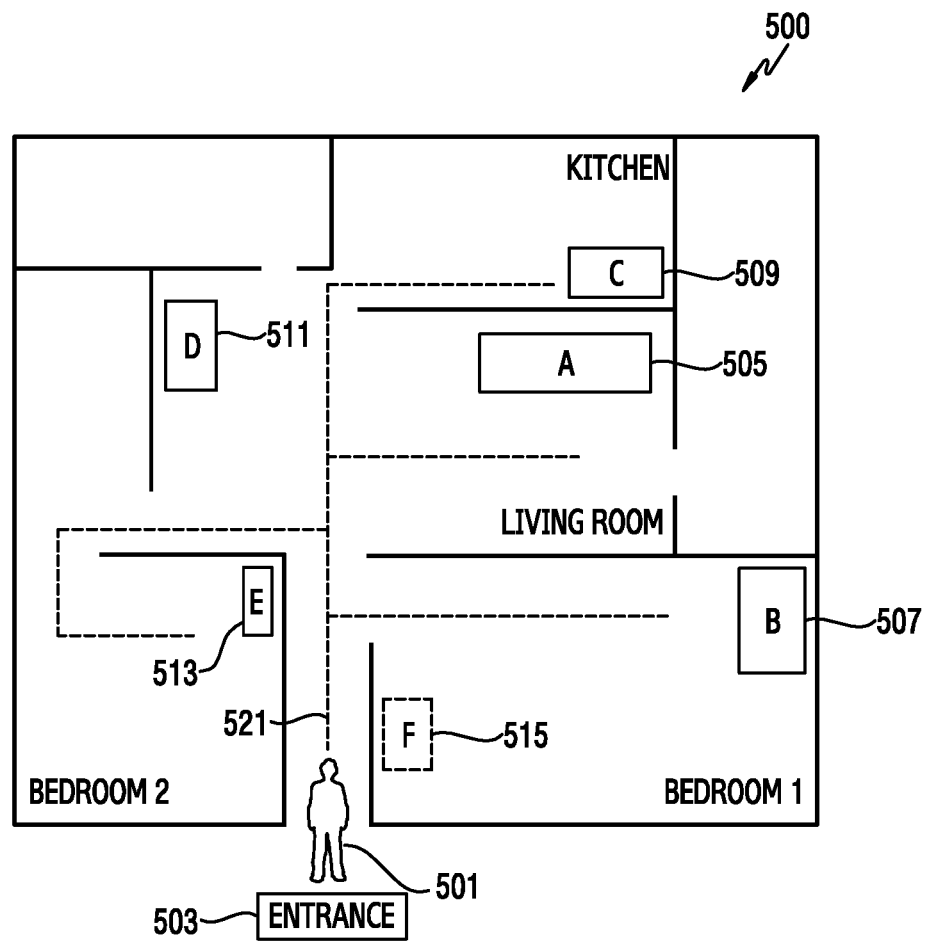
FIG. 5 illustrates an indoor area in which a plurality of devices are provided according to an embodiment of the present disclosure.
Figure 6A:
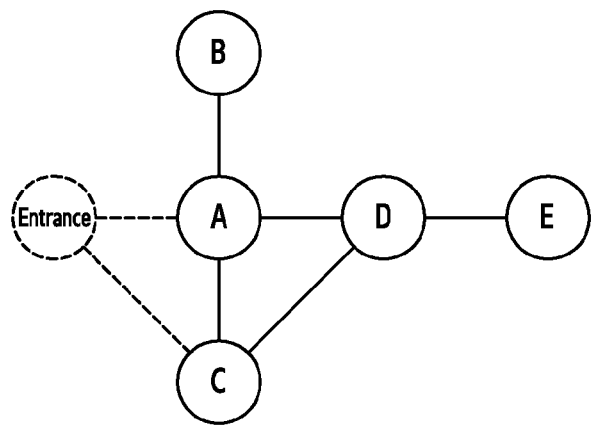
FIGS. 6A, 6B, and 6C illustrate relational models of a plurality of devices provided in an indoor area according to an embodiment of the present disclosure.
Figure 6B:
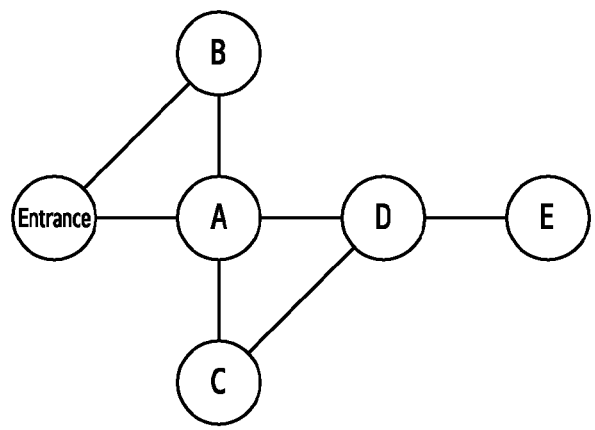
Figure 6C:
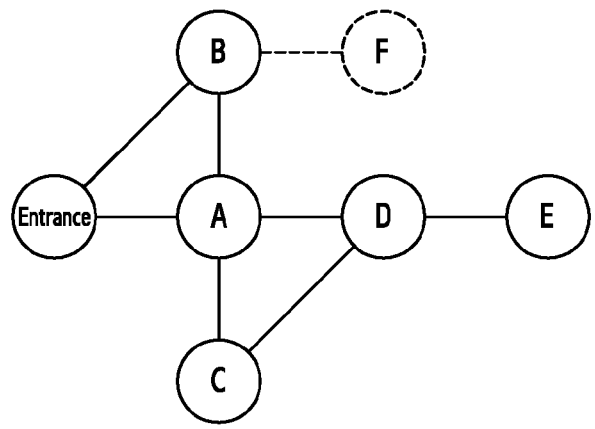

FIG. 5 illustrates an indoor area in which a plurality of devices is provided according to an embodiment of the present disclosure. FIGS. 6A, 6B, and 6C illustrate relational models of a plurality of devices provided in an indoor area according to an embodiment of the present disclosure.

Referring to FIGS. 5, 6A, 6B, and 6C, an indoor area 500 may include at least one device 507, 509, 511, 513, or 515 (e.g., including the first device 100 and the second device 300) including a device A 505 (e.g., the electronic device 200). A user detection sensor may be provided or not provided in an entrance 503 of the indoor area 500. The device A 505, the device B 507, the device C 509, the device D 511, and the device E 513 may each include the user detection sensor, and the device F 515 may not include the user detection sensor.

The device A 505 and the device D 511 may be located in a living room of the indoor area 500. The device B 507 and the device F 515 may be located in a bedroom 1. The device C 509 may be located in a kitchen. The device E 513 may be provided in a bedroom 2. A relational model may be generated if a user 501 moves in an area where each device is provided, starting from the entrance 503 through a path 521 shown in the FIG. 5, but the present disclosure is not limited thereto. The relational model may be generated by using any one of the devices located in the indoor area 500 as a starting point. A relational model generated by using the entrance 503 as the starting point may be the same as a relational model generated by using any one of the devices located in the indoor area 500 as the starting point.

According to an embodiment, the processor 290 provided in the device A 505 may generate a relational model as shown in FIG. 6A on the basis of a user's 501 movement detected in the devices in the indoor area 500. In a state where the user detection sensor is not provided in the entrance 503, if the user 501 moves from the entrance 503 to the bedroom 1, the device B 507 provided in the bedroom 1 may transmit to the processor 290 sensing information obtained from the provided user detection sensor. If it is confirmed that the user 501 is detected in the device A 505 within a certain time after the user 501 is detected in the device B 507, the processor 290 may confirm that the device A 505 and the device B 507 have a positional relation.

The processor 290 may receive sensing information for informing that the user 501 is detected in the device A 505 and the user 501 is detected sequentially in the device D 511 and the device C 509 within a certain time. The processor 290 may confirm that the device D 511 and the device C 509 have a positional relation with the device A 505 by using the sensing information received from the device D 511 and the device C 509. In this case, since the user 501 must pass by the device D 511 located in the living room to go to the kitchen, the processor 290 may sequentially receive sensing information from the device D 511 and the device C 509. If sensing information is received from the device D 511 and the device C 509 within a certain time, the processor 290 may confirm that the device D 511 and the device C 509 have a positional relation.

The processor 290 may receive sensing information from the device C 509, and may receive sensing information again from the device D 511 to indicate that the user 501 has been detected within a certain time. Since the sensing information is received two times from the device D 511, the processor 290 may confirm that it is necessary to pass by the device D 511 to access the device C 509. The processor 290 may receive sensing information indicating that the user 501 has been detected by the device E 513 within a certain time after receiving the second sensing information from the device D 511. Accordingly, the processor 290 may confirm that the device C 509 and the device D 511 have a positional relation, and the device D 511 and the device E 513 have a positional relation.

According to an embodiment, the processor 290 provided in the device A 505 may generate a relational model as shown in FIG. 6B on the basis of the user movement detected in the devices in the indoor area 500. In a state where the user detection sensor is provided in the entrance 503, the processor 290 may receive sensing information detected from the user detection sensor provided in the entrance 503. In this case, a module capable of performing wireless communication may be provided in the entrance 503. The processor 290 may receive sensing information from the module provided in the entrance 503 and receive sensing information from the device B 507 within a certain time. The processor 290 may confirm that the entrance 503 and the device B 507 have a positional relation.

If the processor 290 detects the user 501 in the device A 505 within a certain time after receiving sensing information from the device B 507, the processor 290 may confirm that the device A 505 and the device B 507 have a positional relation. In this case, the processor 290 may receive sensing information from the module provided in the entrance 503, and if the user 501 is detected in the device A 505 within a certain time, and may confirm that the entrance 503 and the device A 505 have a positional relation. In addition, since the method of generating the relational model of other devices except for the entrance 503, the device A 505, and the device B 507 is described above with reference to FIG. 6A, a description thereof is omitted here.

According to an embodiment, the processor 290 provided in the device A 505 may generate a relational model as shown in FIG. 6C on the basis of the user movement detected in the devices in the indoor area 500. Since the method of generating the relational model of the entrance 503, the device A 505, the device B 507, the device C 509, the device D 511, and the device E 513 is described above with reference to FIGS. 6A and 6B, a description thereof is omitted here.

The processor 290 may confirm the positional relation between the device B 507 and the device F 515 in which the user detection sensor is not provided. If the device F 515 is activated by a user's 501 input or is manipulated by the user's 501 input, sensing information corresponding thereto may be transmitted to the device A 505. In this case, if the device A 505 detects the movement of the user 501 in the device B 507 and sensing information is received from the device F 515 within a certain time, it may be confirmed that the device B 507 and the device F 515 have a positional relation. In addition, in a state where the relational model is generated as shown in FIGS. 6A, 6B, and 6C, the processor 290 may continuously update the relational model by additionally using sensing information on the movement of the user 501.

In a case where the user 501 is simultaneously detected in devices in different locations, the processor 290 may regard the plurality of devices as a single device by combining a device having a larger display with other devices. For example, the device A 505 may have a device G around the device A 505. In this case, if a time at which the user 501 is detected by the device A 505 and a time at which the user 501 is detected by the device G are within a threshold time, the device A 505 may determine that a distance between the device A 505 and the device G is very close, and thus the device A 505 and the device G may be regarded as the device A 505 if the relational model is generated.

Figure 7A:
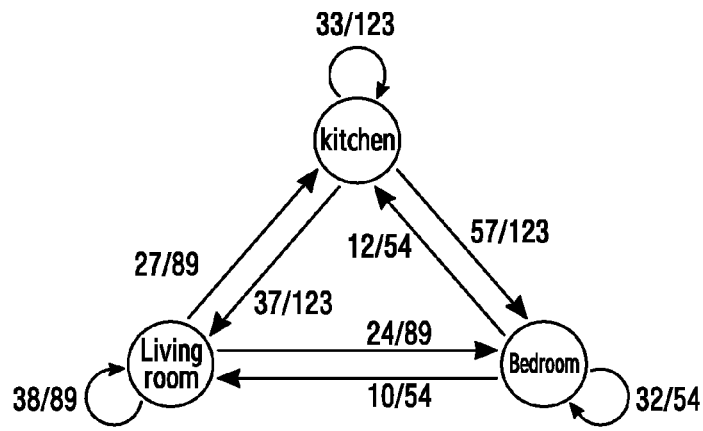
FIGS. 7A, 7B, and 7C illustrate probability models of a plurality of devices provided in an indoor area according to an embodiment of the present disclosure.
Figure 7B:
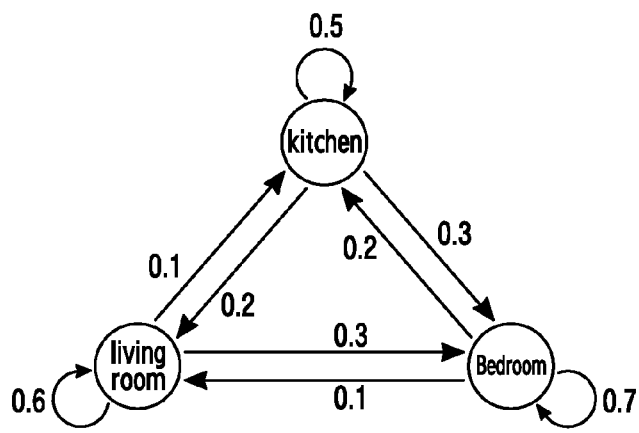
Figure 7C:
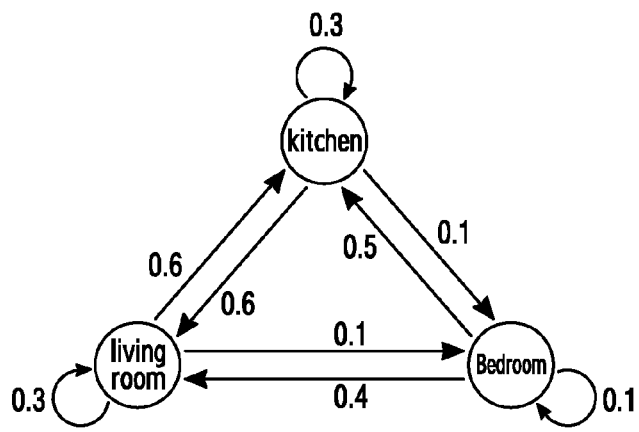

FIGS. 7A, 7B, and 7C illustrate probability models of a plurality of devices provided in an indoor area according to an embodiment of the present disclosure. Referring to FIGS. 7A, 7B, and 7C, a method of generating a probability model if the electronic device 200, the first device 100, and the second device 300 are in a living room, a bedroom, and a kitchen, respectively, is as shown in FIGS. 7A, 7B, and 7C. In this case, although an example of generating the probability model for the living room, the kitchen, and the bedroom in the indoor area is described, this is also applicable to the indoor area 500 of FIG. 5.

According to an embodiment, FIG. 7A may relate to a probability model generated by accumulating a user's movement. If there is no accumulated data to generate the probability model as shown in FIG. 7A, the processor 290 may set a basic probability of moving from each place to another place to 1/n. For example, the processor 290 might not assign a weight to a certain place, but may set a probability of moving from the living room to the bedroom to 1/3, set a probability of moving from the bedroom to the kitchen to 1/3, and set a probability of moving from the kitchen to the living room to 1/3. As such, the processor 290 may set a basic probability of moving from one place to another place to 1/n (where n is a number of devices provided in the indoor area or the number of regions in which the devices are provided in the indoor area) if the probability model is initially generated.

The processor 290 may accumulate the user's movement obtained in the electronic device 200, the first device 100, and the second device 300, and may confirm starting and ending points on a basis of accumulated movement. The processor 290 may calculate a probability for a number of times a user moves from a certain location to another location by using the set basic probability and the accumulated movement. In this case, the probability of moving from each location to another location may be calculated as the total number of times of moving from a certain departure point to a certain destination divided by the total number of times of leaving the certain departure point.

For example, if the total number of times of departing from the living and returning to the living room divided by the total number of times of leaving the living room is 38/89, the processor 290 may calculate the probability of moving from the living room to the living room as 38/89. In addition, if the total number of times of moving from the living room to the kitchen divided by the total number of times of departing from the living room is 27/89, the processor 290 may calculate the probability of moving from the living room to the kitchen as 27/89. The processor 290 may update the probability model whenever the user's movement is detected. Therefore, the processor 290 may use the generated probability model to predict a probability that the user may move from a current location or a final location to another location.

According to an embodiment, FIG. 7B may relate to a probability model generated by using a Markov model. For example, the processor 290 may accumulate a user's movement detected in the electronic device 200, the first device 100, and the second device 300 provided in the living room, the bedroom, and the kitchen, respectively. The processor 290 may generate the probability model by using the Markov model, and may use the generated probability model to predict a probability that the user may move from one location to another location.

For example, the processor 290 may calculate a probability of going from the kitchen to the bedroom via a certain place as follows. Referring to FIG. 7B, a case of going from the kitchen to the bedroom via the certain place includes three cases such as "kitchen->kitchen->bedroom", "kitchen->living room->bedroom", "kitchen->bedroom->bedroom". In this case, the processor 290 may set a basic probability that the user moves from the kitchen 33.33%. Because three places, that is, the living room, the bedroom, and the kitchen, are present in the indoor area, a basic probability of moving from each place to another place may be set to 1/n. In this case, if the second device 300 located in the kitchen is larger than the electronic device 200, a weight may be assigned to the second device 300 so that the basic probability is set to be high.

The probability of moving to the kitchen->kitchen->bedroom is 0.33×0.5×0.3, the probability of moving to the kitchen->living room->bedroom is 0.33×0.2×0.3, and the probability of moving to the kitchen->bedroom->bedroom is 0.33×0.3×0.7. Thus, the probabilities may be respectively 5%, 2%, and 7%. Therefore, the processor 290 may calculate a probability of departing from the kitchen and going to the bedroom via a certain place as 14%. As such, the processor 290 may use the probability model generated by the Markov model to calculate the probability that the user may move from the current location or the final location to another location.

According to an embodiment, FIG. 7C may relate to a probability model generated by accumulating a user's movement per time. The processor 290 may accumulate the user's movement detected in the electronic device 200, the first device 100, and the second device 300, which are provided in the living room, the bedroom, and the kitchen, respectively, per time or day of week. The processor 290 may calculate a probability of moving from each place to another place per time on a basis of the accumulated movement as shown in FIG. 7C. As such, the processor 290 may generate a time-optimized probability model. The processor 290 may calculate a probability that the user may move from a current location or a final location to another location on a basis of a time at which the current location or final location of the user is confirmed. The processor 290 may store in the memory 270 the probability model generated by using the method of FIGS. 7A, 7B, and 7C.

The processor 290 may set a sensing level of a user's detection in three levels. In this case, a first level is a level at which a movement of an object may be detected, a second level is a level at which the object corresponding to the detected movement may be detected as a person, and a third level is a level at which a plurality of persons may be distinguished. If the processor 290 sets the sensing level of the user's detection to the third level, the processor 290 may generate a probability model for each user.

Figure 8:
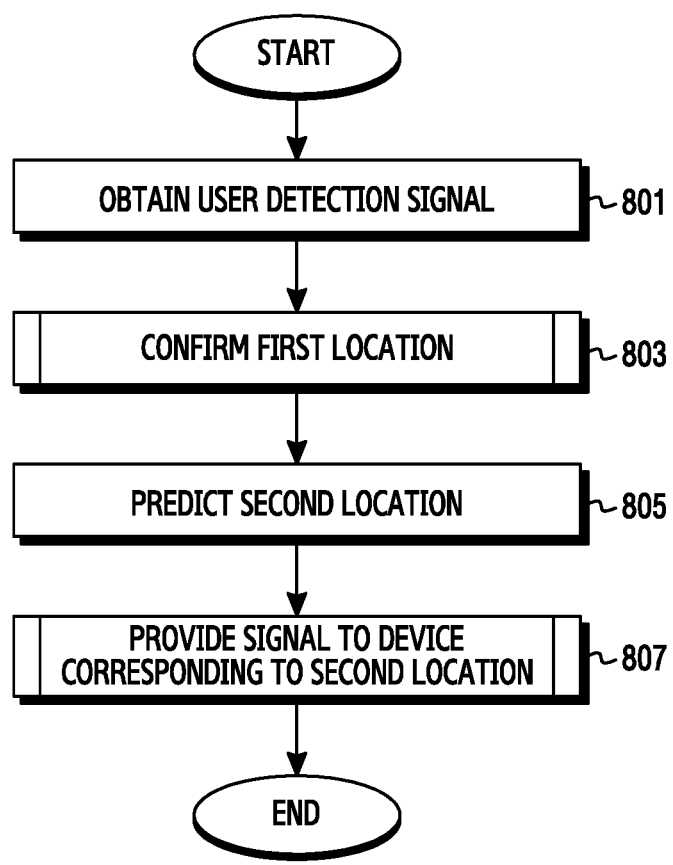
FIG. 8 illustrates a method of operating an electronic device according to an embodiment of the present disclosure.

FIG. 8 illustrates a method of operating an electronic device according to an embodiment of the present disclosure.

Referring to FIG. 8, in step 801, the processor 290 may obtain a user detection signal. In step 803, the processor 290 may confirm a first location of a user from the user detection signal obtained in step 801. Step 803 for confirming the first location of the user is described below in greater detail with reference to FIG. 9. In this case, the first location of the user may be a current location or a final location of the user.

Upon confirming the first location of the user, the processor 290 may perform step 805. In step 805, the processor 290 may predict a second location of the user. In step 805, the processor 290 may confirm an expected movement path of the user on a basis of a relational model or probability model stored in the memory 270. The processor 290 may predict the second location to which the user may move on a basis of the first location from the expected movement path confirmed by the relational model or probability model. The processor 290 may predict all locations to which the user may move from the first location as the second location by using the relational model. The processor 290 may confirm an order for a location having a high probability that the user moves thereto from the first location by using the probability model, and may predict the second location on a basis of the confirmed order.

Upon predicting the second location of the user in step 805, the processor 290 may perform step 807. In step 807, the processor 290 may provide a signal to a device corresponding to the predicted second location. In this case, the signal is an information service providing signal, and step 807 for providing the information serving providing signal is described below in greater detail with reference to FIG. 10.

Figure 9:
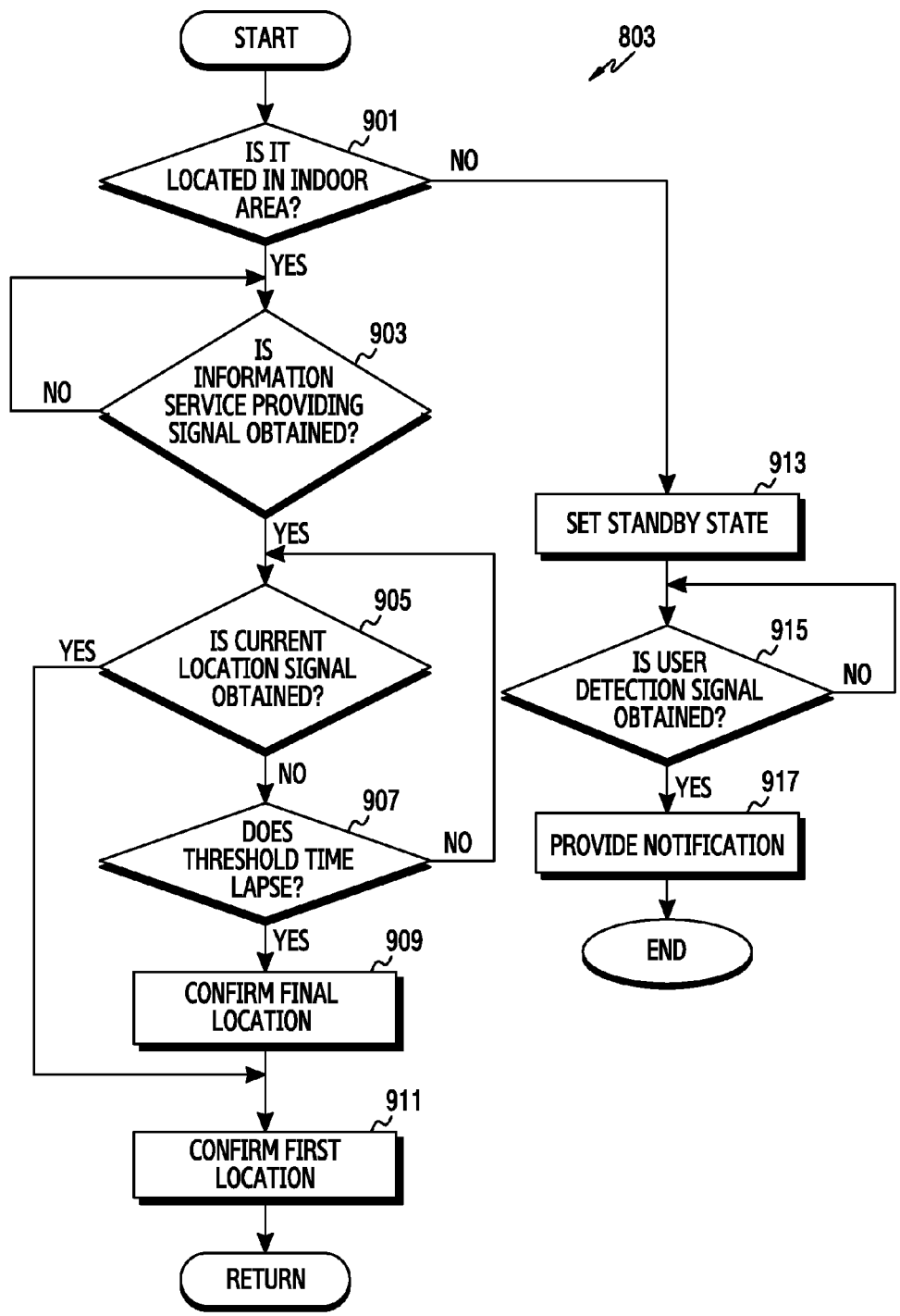
FIG. 9 illustrates a method of confirming a first location of a user in an electronic device according to an embodiment of the present disclosure.

FIG. 9 illustrates a method of confirming a first location of a user in an electronic device according to an embodiment of the present disclosure.

Referring to FIG. 9, in step 901, the processor 290 may confirm whether a user is located in an indoor area from an obtained user detection signal. In this case, the user detection signal may confirm whether the user is located in the indoor area from a signal received from a user's portable device or a wearable device registered to the electronic device 200, information regarding an opening/closing of a door in the indoor area, a strength of a Wi-Fi or Bluetooth signal output from the user's portable device or the wearable device, and a device (e.g., the electronic device 200, the first device 100, and the second device 300) provided in the indoor area. Upon receiving from the portable device or the wearable device a signal for changing devices in the indoor area to a first standby state, the processor 290 may confirm that the user is not located in the indoor area. The processor 290 may use a relational model or probability model stored in the memory 270 to confirm whether the user is located in the indoor area. If the user is not detected in any device in the indoor area for a threshold time after the user is detected in an entrance, the processor 290 may confirm that the user is not located in the indoor area.

If it is confirmed in operation 901 that the user is not located in the indoor area, the processor 290 may perform step 913. In step 913, the processor 290 may set a standby state for all devices (e.g., electronic device 200, first device 100, and second device 300) located in the indoor area to the first standby state. In this case, the first standby state may indicate a state in which only a user detection sensor provided in each device and a communication module capable of performing communication among respective devices are activated in order to minimize power consumption.

If it is detected in step 915 that a user detection signal is obtained from at least one device set to the first standby state, the processor 290 may perform step 917. In step 917, the processor 290 may confirm that an illegal intrusion has occurred in the indoor area and provide a notification to all devices (e.g., the electronic device 200, the first device 100, and the second device 300). Further, the processor 290 may provide the notification to the user's portable device or the wearable device registered to the electronic device 200. Furthermore, the processor 290 may provide the notification to a pre-stored telephone number, a police station, or the like, and may end the present process.

If it is confirmed in step 901 that the user is located in the indoor area, the processor 290 may perform step 903. In step 903, the processor 290 may confirm whether an information service providing signal is obtained. If the information service providing signal is obtained in step 903, the processor 290 may perform step 905. In this case, the information service providing signal may be a signal for information or the like including at least one of an operational state of at least one home appliance located in the indoor area, a time at which the user operates the home appliance while moving in the indoor area, a certain function executed in the home appliance according to a user's input, information combining or integrating information or situations confirmed in the home appliance, and a user schedule stored in a portable device or a wearable device of the user.

In step 905, the processor 290 may confirm whether the user has obtained a signal for a current location of the user. If the signal for the current location of the user is obtained at a time of obtaining the information service providing signal, the processor 290 may perform step 911. If a device present in a place where the user is currently located includes a user detection sensor, the processor 290 may confirm the current location of the user from sensing information obtained from the user detection sensor. In step 911, the processor 290 may confirm the current location of the user, and may return to step 805 of FIG. 8.

If it is not confirmed in step 905 that the signal for the current location of the user is obtained at a time at which the processor 290 obtains the information service providing signal, the processor 290 may perform step 907. In step 907, if a threshold time lapses in a state where the signal for the current location is not obtained after the information service providing signal is obtained, the processor 290 may perform step 909. In step 909, the processor 290 may confirm a final location of the user, and may perform step 911. In step 911, the processor 290 may confirm the confirmed final location of the user as the first location, and may return to step 805 of FIG. 8. If the threshold time does not lapse in step 907, the processor 290 may return to step 905.

Figure 10:
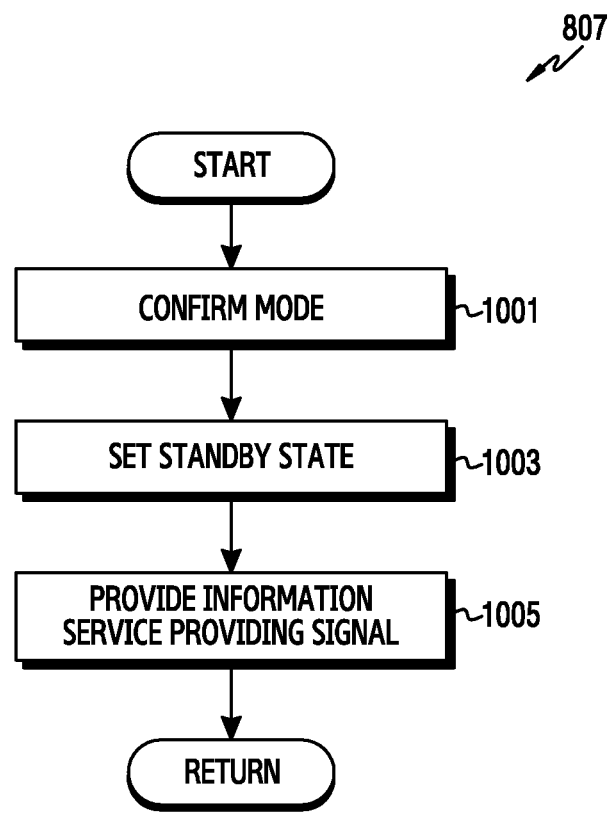
FIG. 10 illustrates a method of providing a signal to a device corresponding to a second location in an electronic device according to an embodiment of the present disclosure.

FIG. 10 illustrates a method of providing a signal to a device corresponding to a second location in an electronic device according to an embodiment of the present disclosure.

Referring to FIG. 10, in step 1001, the processor 290 may confirm a mode of an information service providing signal obtained in step 903 of FIG. 9. The processor 290 may confirm a certain mode in which the information service providing signal is generated among a user call mode, a user access mode, or a user emergency mode. In step 1003, the processor 290 may set a standby state of a device present in the second location predicted in step 805 of FIG. 8 to a second standby state according to the confirmed mode of the information service providing signal. In this case, the second standby state may be a state in which a user detection sensor provided in each device, a communication module capable of performing communication among respective devices, and a processor included in each device are activated. If a display of the device present in the second location is in an activated state, the processor 290 may not separately set the standby state of the device.

According to an embodiment, if the information service providing signal is in the user call mode, the processor 290 may sequentially set all devices corresponding to an expected user's movement path predicted in a first location to the second standby state as in step 805 of FIG. 8. If the information service providing signal is in the user access mode, the processor 290 may set a device corresponding to the second location where the user is expected to move immediately from the first location to the second standby state as in step 805 of FIG. 8. If the information service providing signal is in the user emergency mode, the processor 290 may set all devices corresponding to the expected user's movement path predicted in the first location to the second standby state.

In step 1005, the processor 290 may provide the information service providing signal to the device present in the second location so that a function corresponding to the information service providing signal may be performed in the device present in the second location. The device present in the second location may control a speaker to output a message or the like corresponding to the information service providing signal as sound data. The device present in the second location may control a display to output a message or the like corresponding to the information service providing signal as video data. The device present in the second location may control a motor or the like to perform an operation corresponding to the information service providing signal.

The device present in the second location may perform a function corresponding to the information service providing signal according to a type of the information service providing signal. According to an embodiment, if the information service providing signal is in the user call mode, the processor 290 may sequentially provide the information service providing signal to devices set to the second standby state depending on a certain time interval. The devices set to the second standby state may sequentially perform a function corresponding to the information service providing signal. According to an embodiment, if the information service providing signal is in the user access mode, the processor 290 may provide the information service providing signal to the device set to the second standby state. The device set to the second standby state may perform the function corresponding to the information service providing signal at a time of detecting that the user arrives in the second location. For example, if the information service providing signal is in the user access mode, the device present in the second location may accumulate and update the information service providing signal received from the processor 290 on a real time basis or periodically, and thereafter may sequentially perform the function corresponding to the information service providing signal accumulated or updated at a time of detecting a user access. According to an embodiment, if the information service providing signal is in the user emergency mode, the processor 290 may simultaneously provide the information service providing signal to all devices set to the second standby state. Accordingly, all devices set to the second standby state may simultaneously perform the function corresponding to the information service providing signal.

Figure 11A:
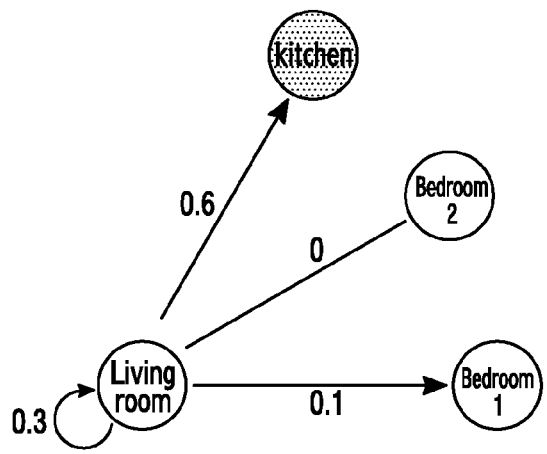
FIGS. 11A, 11B, and 11C illustrate a method of setting a standby state of an indoor area in an electronic device according to an embodiment of the present disclosure.
Figure 11B:
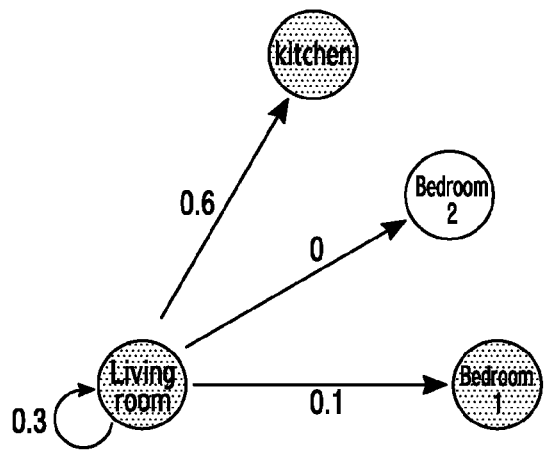
Figure 11C:
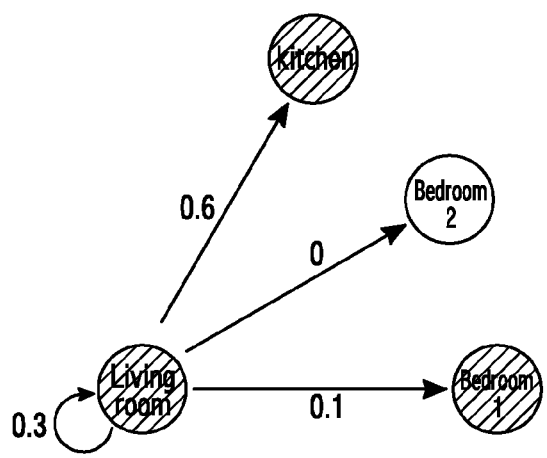

FIGS. 11A, 11B, and 11C illustrate a method of setting a standby state of an indoor area in an electronic device according to an embodiment of the present disclosure.

Referring to FIGS. 11A, 11B, and 11C, if the processor 290 obtains a signal of a current location as in step 905 of FIG. 9, the processor 290 may confirm the current location as a first location. The processor 290 may provide an information service providing signal to a device present in the current location. Returning to step 805 of FIG. 8, the processor 290 may predict a second location. Further, if a threshold time lapses in a state where the signal of the current location is not obtained as in step 905 of FIG. 9, the processor 290 may confirm a final location of a user in step 909. Upon confirming the final location of the user, the processor 290 may confirm the final location as the first location. Returning to step 805 of FIG. 8, the processor 290 may predict the second location.

According to an embodiment, if it is confirmed that the current location or final location of the user is a living room, the processor 290 may predict the second location as shown in FIGS. 11A to 11C. As shown in FIG. 11A, a relational model or probability model stored in the memory 270 may be used to confirm a movement probability for each location. For example, the processor 290 may confirm that a probability of moving from the living room to the living room is 0.3, a probability of moving from the living room to the kitchen is 0.6, a probability of moving from the living room to the bedroom 1 is 0.1, and a probability of moving from the living room to the bedroom 2 is 0. By using these probabilities, the processor 290 may confirm an order of the movement probability.

The processor 290 may calculate a threshold value by substituting N with 4 in the expression $((100/N)/2)\%$ (i.e., $((100/4)/2)\% = 12.5\%$) since there are four locations to which the user may move from the living room. The processor 290 may select a location whose movement probability is greater than or equal to the calculated threshold value as a first candidate group and exclude a location whose confirmed movement probability is less than the calculated threshold value for the candidate group. The processor 290 may set a device present in a location excluded from the candidate group to a first standby state. Since the calculated threshold value is 12.5%, the processor 290 may select the living room and kitchen having a probability greater than 12.5% as the first candidate group and set the bedroom 1 and the bedroom 2 to the first standby state.

The processor 290 may subtract a probability of moving from the living room to the kitchen and a probability of moving from the living room to the living room, and since the subtracted value is greater than the calculated threshold value, the processor 290 may set only the device located in the kitchen to a second standby state as shown in FIG. 11A by a stipple pattern. If the information service providing signal confirmed in step 1001 of FIG. 10 is in a user access mode, the processor 290 may set a standby state of a device present in the second location (e.g., the kitchen) to the second standby state by using the method illustrated in FIG. 11A, and may provide the information service providing signal to the device set to the second standby state. Since the information service providing signal is in the user access mode, the device present in the kitchen may confirm user access detection and provide the confirmation to the processor 290. The processor 290 may detect a user access to the device present in the kitchen and, if the user access is detected, provide the information service providing signal to the device present in the kitchen.

According to an embodiment, if the processor 290 confirms that a current location or a final location of the user is the living room, the processor 290 may confirm a movement probability for each location by using a relational model or probability model stored in the memory 270 as shown in FIG. 11B. The processor 290 may confirm that a place located close to the living room is the kitchen and the bedroom 1 on a basis of the movement probability. In this case, the close distance may indicate all of the places whose movement probability is not 0.

The processor 290 may confirm an order of all locations to which the user may move from the living room on a basis of the movement probability. The processor 290 may set a predicted order of movement locations on a basis of the confirmed order. Referring to FIG. 11B, regarding the predicted order of movement locations of the user, with respect to the living room, the kitchen may be set to a first order, the living room may set to a second order, and the bedroom 1 may be set to a third order. The bedroom 2 may be excluded from the predicted order of movement locations. Since a probability of moving from the living room to the bedroom 2 is 0 according to the movement probability shown in FIG. 11B, it may be confirmed that a different location, for example, the kitchen or the bedroom 1, must be passed through in order to access the bedroom 2 from the living room. Therefore, the processor 290 may set the device present in the bedroom 2 to the first standby state.

The processor 290 may set the standby state of the devices provided in the kitchen, the living room, and the bedroom 1 to the second standby state with a specific time interval according to the predicted order. If the information service providing signal confirmed in step 1001 of FIG. 10 is in the user call mode, the processor 290 may sequentially set the standby state of the devices present in the kitchen, the living room, and the bedroom 1 to the second standby state by using the method of FIG. 11B. The processor 290 may sequentially provide the information service providing signal according to the second standby state which is sequentially set. Since the information service providing signal is in the user call mode, the processor 290 may set the device present in the kitchen whose prediction order is the first order to the second standby state, and may provide the information service providing signal to the device present in the kitchen. After the information service providing signal is provided to the device present in the kitchen, if a certain time lapses, the processor 290 may set the device present in the living room whose prediction order is the second order to the second standby state, and may provide the information service providing signal to the device present in the living room. After the information service providing signal is provided to the device present in the living room, if a certain time lapses, the processor 290 may set the device present in the bedroom 1 whose prediction order is the third order to the second standby state, and may provide the information service providing signal to the device present in the bedroom 1.

According to an embodiment, if the processor 290 confirms that the current location or a final location of the user is the living room, the processor 290 may confirm a movement probability for each location by using a relational model or probability model stored in the memory 270 as shown in FIG. 11C. The processor 290 may confirm that a place located close to the living room is the kitchen and the bedroom 1 on a basis of the movement probability. In this case, the close distance may indicate all of the places whose movement probability is not 0. The processor 290 may set a standby state of a device present in a location (e.g., the bedroom 2) whose movement probability is 0 to the first standby state, and may set a standby state of all devices present in locations (e.g., the kitchen, the bedroom 1) whose movement probability is greater than 0 to the second standby state, as indicated by the striped pattern.

If the information service providing signal confirmed in step 1001 of FIG. 10 is in the user emergency mode, the processor 290 may set the standby state of the devices present in the kitchen and the bedroom 1 to the second standby state by using the method illustrated in FIG. 11C, and may simultaneously provide the information service providing signal to the devices set to the second standby state. In this case, if the processor 290 confirms that a display of the device present in the current location or the final location (e.g., the living room) of the user is activated, the processor 290 may simultaneously provide the information service providing signal to the device present in the living room and the devices present in the kitchen and bedroom 1 set to the second standby state.

Figure 12:
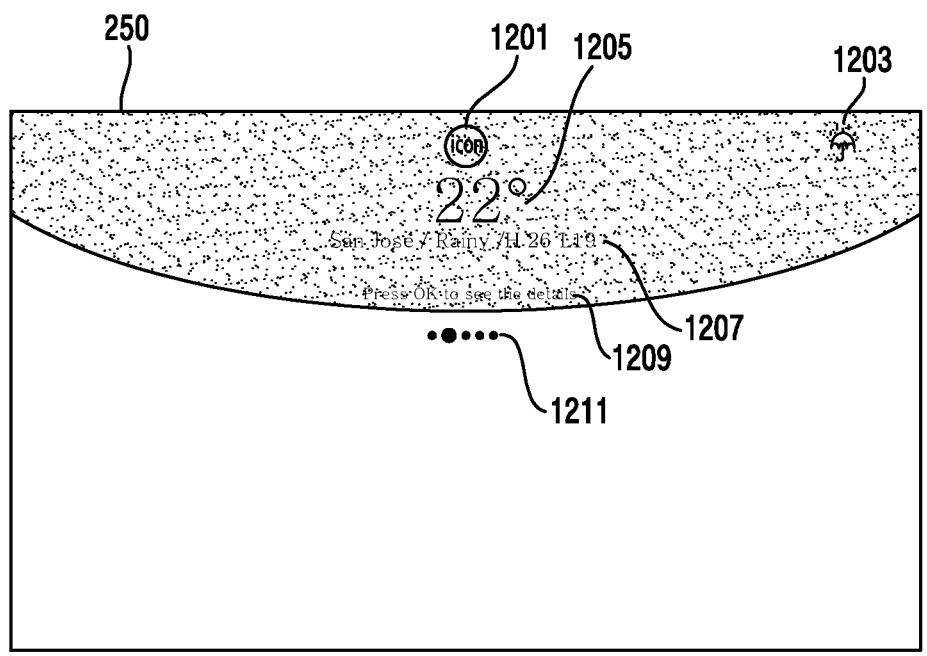
FIG. 12 illustrates a user interface of an electronic device according to an embodiment of the present disclosure.

FIG. 12 illustrates a user interface of an electronic device according to an embodiment of the present disclosure.

Referring to FIG. 12, if the electronic device 200 is in a second standby state, the display 250 of the electronic device 200 may perform a function corresponding to an information service providing signal according to a user interface as shown in FIG. 12. For example, if the information service providing signal is generated in a state where the electronic device 200 is set to the second standby state, the processor 290 may activate only one part of the display 250. A service/product identifier 1201, related information image 1203, headline 1205, additional information 1207, interaction guide message 1209, indicator 1211, or the like related to the information service providing signal may be displayed on one part of the display 250.

The service/product identifier 1201 may be represented by an icon as an element for indicating a source or a connector of information. The related information image 1203 may be an image corresponding to the information service providing signal in the activated part. The headline 1205 and the additional information 1207 are in areas for displaying messages corresponding to the information service providing signal received from a home appliance, and may be classified and displayed according to an importance and detail of the information. The interaction guide message 1209 may execute an application related to the information service providing signal or may display information capable of confirming detailed information. The interaction guide message 1209 may display a message for guiding an interaction method through a remote control button input, a voice input, a gesture input, a touch input, or the like. The indicator 1211 may indicate that there is information regarding a plurality of information service providing signals. Information displayed on one part of the display 250 activated if the information service providing signal is generated is described below in greater detail with reference to FIGS. 13A, 13B, 13C, 13D, 13E, 13F, 14A, 14B, 14C, 15A, 15B, and 15C.

FIGS. 13A, 13B, 13C, 13D, 13E, and 13F illustrate a method of outputting information if a user access is detected in an electronic device according to an embodiment of the present disclosure.

Referring to FIGS. 13A, 13B, 13C, 13D, 13E, and 13F, if an information service providing signal of a user access mode is generated in a state where the electronic device 200 is set to a second standby state, the processor 290 may confirm whether a user has accessed the electronic device 200. The processor 290 may activate one part of the display 250 to display a user interface if the user has accessed the electronic device 200 as shown in FIG. 13A. The processor 290 may display an icon 1301 having a shape of a washing machine as a service/product identifier, and may display a message 1305 related to the washing machine as a headline. The processor 290 may display an indicator 1311 to indicate the number of pieces of information accumulated since the user access. If the user interface is displayed as shown in FIG. 13A and a threshold time lapses, the processor 290 may display the message 1305 to indicate that washing has been completed as shown in FIG. 13B in a headline area, and may display a message 1307 indicating that laundry was done six minutes ago.

In this case, the processor 290 may receive information from the washing machine as shown in Table 1 below.

TABLE 1

| Element | Description |
| --- | --- |
| Device information (ID, name) | Samsung, WD21J9840KG |
| Sensing source ID | Processing model |
| Information ID | 12345678 |
| Information generation time | 2016.03.26.17.23.15. |
| Information classification | Report |
| Information valid time/condition | 3 hours |
| Information display period | 30 mins |
| Information text | Laundry done |
| Information image | Image source/URL |
| Information sound | Sound source/URL |
| Information video | Video source/URL |
| Related App information | App URL |
| Reserved | . . . |

If the threshold time lapses after indicating that the laundry is done, the processor 290 may display an icon 1301 having a shape of a robot cleaner as a service/product identifier as shown FIG. 13C, and may display a message 1305 to indicate that cleaning has been completed using the robot cleaner as a headline. The processor 290 may display a message 1307 indicating a time at which the cleaning has been completed as additional information. Since cleaning using the robot cleaner uses information on a separate information service providing signal different from laundry using the washing machine, the processor 290 may update and display an indicator 1311.

If the threshold time lapses after informing that the cleaning has been completed, the processor 290 may display an icon 1301 having a shape of an air conditioner as shown in FIG. 13D, and may display a message 1305 indicating that summer is coming as a headline. Since information regarding the air conditioner is different from information on cleaning and laundry, the processor 290 may update and display an indicator 1311. The processor 290 may display a message 1305 to indicate that summer is coming, and if the threshold time lapses, may display the message 1305 to indicate that it is time to replace a filter of the air conditioner as a headline as shown in FIG. 13E. The processor 290 may display the headline shown in FIG. 13D by changing the headline to include additional information as shown in FIG. 13E.

If a confirmation signal is received from a user in a state where a screen is displayed on the display 250 as shown in FIG. 13E or an additional input is received from the user, the processor 290 may display a screen as shown in FIG. 13F. FIG. 13F may relate to a moving picture for explaining a method of cleaning an air conditioner filter. Although it is described in the embodiment of the present disclosure that the information related to the washing machine, the information related to the robot cleaner, and the information related to the air conditioner are accumulated, and the pieces of information are sequentially displayed if a threshold time lapses, the present disclosure is not limited thereto. The processor 290 may display the information related to the washing machine, and upon reception of an input from the user, may change and display a screen as the information related to the robot cleaner or the information related to the air conditioner according to the received input. In addition, the processor 290 may confirm an information validity duration regarding the information service providing signal obtained from a home appliance as shown in Table 2 below. If the information validity duration lapses in a state where information corresponding to the information service providing signal is not output, the information service providing signal may be stored in the memory 270. If the information providing signal is generated from the home appliance, the processor 290 may receive information as shown in Table 2 below.

TABLE 2

| Group element | Specification element | Description |
| --- | --- | --- |
| Element for identifying information | Device information (ID, name) | Name of each device and ID capable of identifying the device |
| | Sensing source ID | ID for identifying a certain sensing source among several sensing sources |
| | Information ID | ID for identifying information among several pieces of information |
| | Information generation time | Time at which information is generated |
| | Information classification | Information classification (alert/warning/remind/error/recommend/report/monitor/etc.) |
| Element of information processing method | Information valid time/condition | Time or condition in which information is valid |
| | Information display period | Period of exposing information of time or condition in which information is valid |
| | Information output mode | User access/user call/user emergency (important) |
| Element for expressing information | Information text | Text for expressing information |
| | Information image | Image for expressing information or related link |
| | Information sound | Sound for expressing information or related link |
| | Information video | Video for expressing information or related link |
| Related additional element and others | Related App information | App information capable of processing information or API factor capable of calling related APP or the like |
| | others | Other information |
| | Reserved | Field considering scalability |

In addition, if the electronic device 200 is set to the second standby state and the information service providing signal in the user access mode is generated, the processor 290 may confirm the user access to the electronic device 200. If the user access is confirmed, the processor 290 may additionally output a message regarding current weather or the like.

FIGS. 14A, 14B, and 14C illustrate a method of outputting information even if a user is not detected in an electronic device according to an embodiment of the present disclosure.

Referring to FIGS. 14A, 14B, and 14C, if the electronic device 200 is set to a second standby state and an information service providing signal of a user call mode is generated, the processor 290 may activate the display 250 to display a user interface as shown in FIG. 14A. The processor 290 may display an icon 1401 having a shape of a robot cleaner as a service/product identifier, and may display a message 1405 related to the robot cleaner as a headline. The processor 290 may display an indicator 1411 to indicate the number of pieces of information to be provided to the user.

If the user interface is displayed as shown in FIG. 14A and a threshold time lapses, the processor 290 may display a message 1407 to indicate a time at which the robot cleaner is trapped as shown in FIG. 14B as additional information, and may display an interaction guide message 1409 to confirm image data of a point where the robot cleaner is trapped. If a signal corresponding to "OK" is input by the user in accordance with the interaction guide message 1409, the processor 290 may display the image data obtained by the robot cleaner on the display 250 as shown in FIG. 14C. The user may confirm the image data to confirm where the robot cleaner is trapped.

In an embodiment, if the electronic device 200 is set to the second standby state and an information service providing signal in the user call mode is generated, the processor 290 may activate one part of the display 250 to display the user interface. In this case, the information service providing signal may be information for indicating that a favorite TV program set by the user is starting. The processor 290 may display information regarding the user's preferred TV program on the display 250. The processor 290 may display the TV program on the display 250 if an input for watching the TV program is received from the user. The information service providing signal in the user call mode may be information regarding a failure of the washing machine, an abnormality in a domestic air condition, or the like.

FIG. 15 illustrates a method of outputting information in a state where a display of an electronic device is activated according to an embodiment of the present disclosure.

Referring to FIGS. 15A, 15B, and 15C, if audiovisual content is being output to the display 250 of the electronic device 200 and an information service providing signal of a user emergency mode is generated, the processor 290 may display information corresponding to the information service providing signal on one part of the display 250 as shown in FIG. 15A. The processor 290 may display an icon 1501 having a shape of an induction range as a service/product identifier, and may display an information message 1505 related to the induction range as a headline. In this case, the processor 290 may simultaneously provide the information service providing signal to all devices present in an expected movement path.

If an operation such as turning off power of the induction range is not confirmed during the threshold time, the processor 290 may stop displaying the audiovisual contents displayed on the display 250 as shown in FIG. 15B. The processor 290 may stop displaying the audiovisual content and may display a message 1509 for displaying the audiovisual content again as additional information. If an input for the "OK" button is received from the user, the processor 290 may reproduce the stopped audiovisual content as shown in FIG. 15C.

In an embodiment, if the audiovisual content is being output on the display 250 of the electronic device 200 and an information service providing signal is generated, the processor 290 may display information corresponding to the service providing signal in one part of the display 250. In this case, the information service providing signal may be information for indicating that a favorite TV program set by the user is starting. The processor 290 may display information regarding the user's favorite TV program on the display 250, and if an input for watching the TV program is received from the user, the processor 290 may end displaying of the audiovisual content currently being watched, and may display the favorite TV program on the display 250. In addition, if the user is watching the audiovisual content in a state where the display 250 of the electronic device 200 is activated and a call is received from a certain person set by the user, the call may be displayed on the display 250. For various cases such as a fire, an illegal invasion, or the like, information corresponding to the information service providing signal may be output to the display 250.

Figure 16:
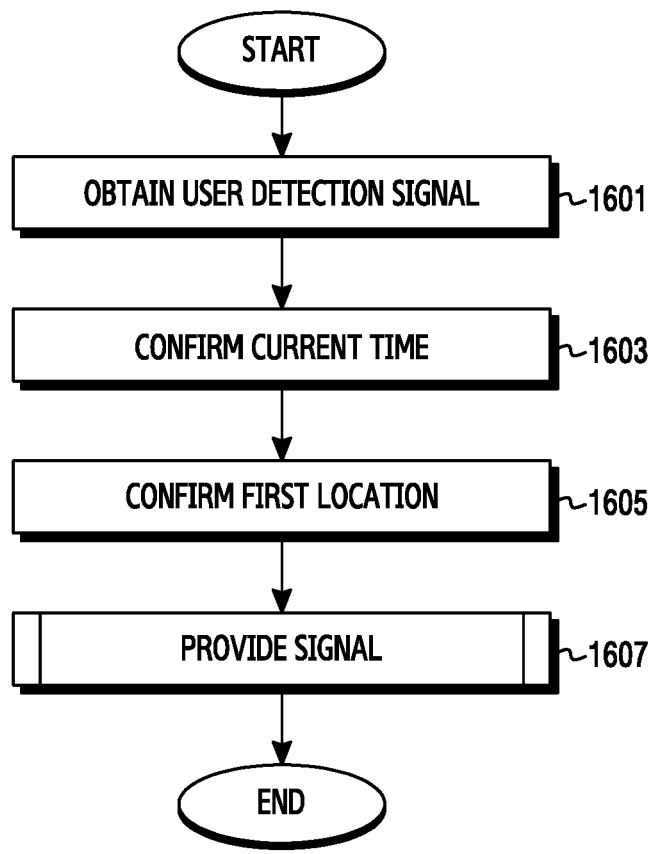
FIG. 16 illustrates a method of operating an electronic device according to an embodiment of the present disclosure.

FIG. 16 illustrates a method of operating an electronic device according to an embodiment of the present disclosure.

Referring to FIG. 16, in step 1601, the processor 290 may obtain a user detection signal. In this case, the user detection signal may be obtained from a user detection sensor provided in the electronic device 200, and may be obtained from devices (the first device 100 and the second device 300) provided in an indoor area. In step 1603, the processor 290 may confirm a time at which the user detection signal is obtained. In step 1605, the processor 290 may confirm a first location on a basis of the obtained user detection signal of the user. In step 1607, the processor 290 may provide a signal corresponding to a current time and the first location. In this case, the signal is the information service providing signal, and an operation of providing the information service providing signal is described below in greater detail with reference to FIG. 17.

Figure 17:
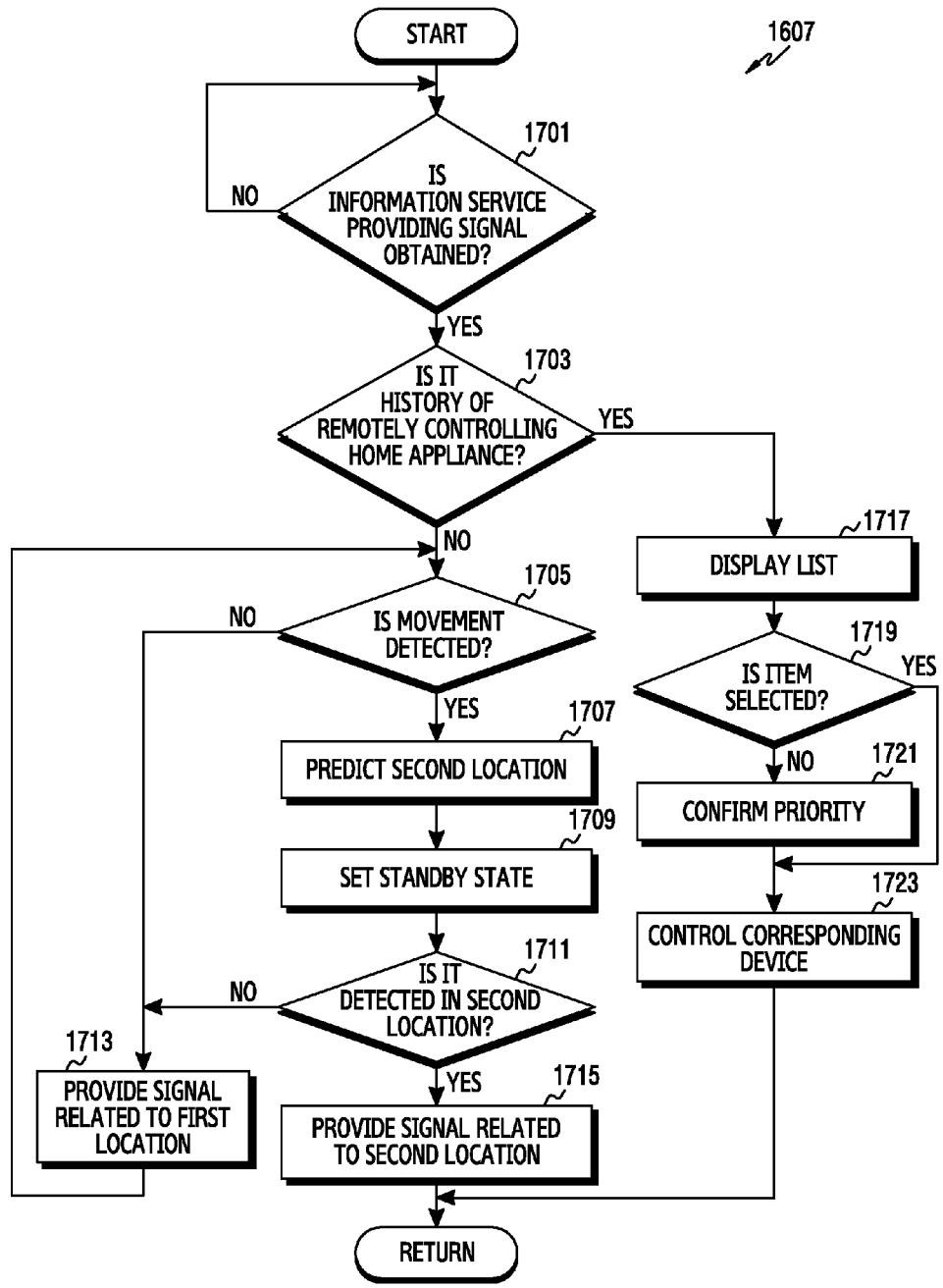
FIG. 17 illustrates a method of providing a signal in an electronic device according to an embodiment of the present disclosure.

FIG. 17 illustrates a method of providing a signal in an electronic device according to an embodiment of the present disclosure.

Referring to FIG. 17, in step 1701, the processor 290 may confirm whether the information service providing signal is obtained in the first location confirmed in step 1605. If it is confirmed in step 1701 that the information service providing signal is obtained, the processor 290 may perform step 1703. If it is not confirmed in step 1701 that the information service providing signal is obtained, the processor 290 may perform step 1701 periodically or on a real time basis. In step 1703, the processor 290 may confirm whether the information service providing signal is a history of remotely controlling a home appliance located in an indoor area in the first location at a current time. If it is confirmed in step 1703 that the information service providing signal is a signal indicating that there is a history of remotely controlling the home appliance in the first location at the current time, the processor 290 may perform operation 1717. If it is not confirmed in operation 1703 that the information service providing signal is the signal indicating that there is a history of remotely controlling the home appliance in the first location at the current time, the processor 290 may perform step 1705.

If a movement of a user is detected in step 1705, the processor 290 may perform step 1707. If the movement of the user is not detected in step 1705, the processor 290 may perform step 1713. In step 1713, the processor 290 may provide the information service providing signal in the first location to a device present in the first location, and may return to step 1705. In step 1707, the processor 290 may predict a second location of the user on a basis of the first location of the user. The second location may be the user's location predicted on a basis of the first location on a predicted movement path of the user by using a relational model or a probability model stored in memory 270. In particular, the processor 290 may predict the second location of the user on a basis of the probability model generated based on a time and a day of the week at which the user is detected among models stored in the memory 270.

In step 1709, the processor 290 may set a standby state of the device present in the second location to a second standby state according to the predicted movement path. In step 1711, the processor 290 may confirm the user's location. If it is confirmed in step 1711 that the user is confirmed in the predicted second location, the processor 290 may perform step 1715. In step 1715, the processor 290 may provide information related to the confirmed second location to the device present in the second location. If it is confirmed in step 1711 that the user is not confirmed in the second location, the processor 290 may perform step 1713. In step 1713, the processor 290 may provide information related to the first location confirmed in step 1701 to the device present in the second location, and may return to step 1705.

If it is confirmed in step 1703 that the information service providing signal is a signal for informing that there is a history of remotely controlling the home appliance in the first location at the current time, in step 1717, the processor 290 may display history information for remotely controlling the home appliance in the first location on the display 250. In step 1719, if any one item is selected from a list of the displayed history information, the processor 290 may perform step 1723. In step 1723, the processor 290 may control a device corresponding to the selected item, and returning to FIG. 16, may end the aforementioned process. In step 1719, if no item is selected from the displayed list, the processor 290 may perform step 1721. In step 1721, the processor 290 may confirm a priority in the history information. In step 1723, the processor 290 may control a corresponding device according to the confirmed priority, and returning to FIG. 16, may end the aforementioned process.

FIGS. 18, 19A, 19B, 19C, 20A, 20B, and 20C illustrate a method of providing information to a user on a basis of a user's location in an electronic device according to an embodiment of the present disclosure.

Figure 18:
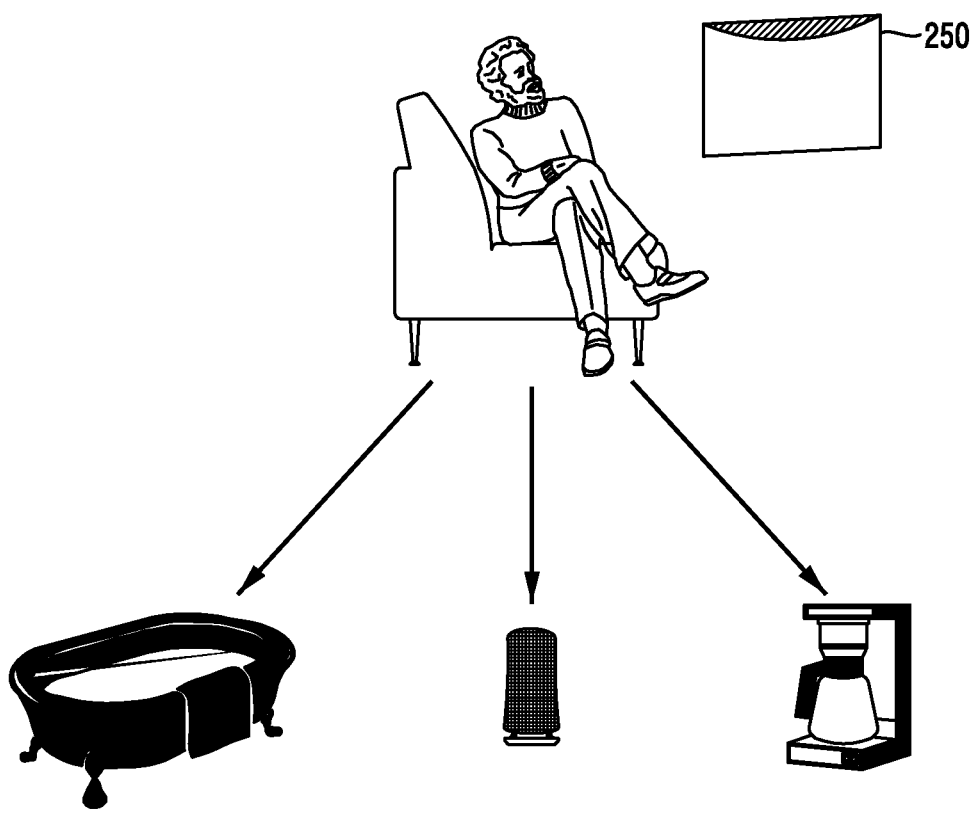

Referring to FIG. 18, if there is a history of remotely controlling a home appliance in a first location (e.g., a living room) at a current time (for example, 8:00 AM) as in operation 1703 of FIG. 17, the processor 290 may display history information for remotely controlling the home appliance to the display 250 of the electronic device 200. For example, as shown in FIG. 18, the history information may be "Watching TV at 8:00 AM->Starting bath and listening to music at 8:30 AM->Extracting coffee in the kitchen at 9:00 AM". If a certain time is not selected from history information displayed on the display 250 as in step 1719 of FIG. 17, the processor 290 may confirm a priority for each item. The processor 290 may control a device (e.g., a bathroom control device) to control water located in a bathroom for a bath at 8:30 AM according to the confirmed priority so that the user receives water with a desired temperature in a bath. The processor 290 may activate a speaker located in an indoor area at 8:30 AM to play a music list set by the user. The processor 290 may control a coffee machine located in a kitchen at 9:00 AM. As in step 1723 of FIG. 17, the processor 290 may display on the display 250 an operational state of a device being controlled.

Figure 19C:
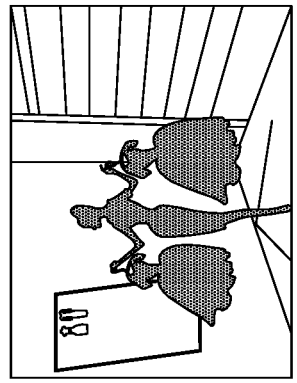
Figure 19B:
Figure 19A:
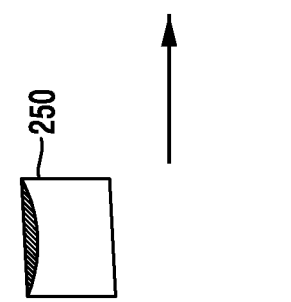

Referring to FIGS. 19A, 19B, and 19C, if the information service providing signal is not the signal for the history of remotely controlling the home appliance, as in step 1703 of FIG. 17, the processor 290 may provide information related to a kitchen to a display of a device located in the first location (e.g., a kitchen) as shown in FIG. 19A. In this case, the information related to the kitchen may be calories consumed by the user or a dinner menu, a recipe, or the like based on the calories. For this, the processor 290 may obtain information related to food and calories consumed by the user on that day through communication with a wearable device of the user.

After the information related to the kitchen such as a dinner menu or the like is provided as shown in FIG. 19A, if a user's movement is detected, the processor 290 may use a relational model or a probability model stored in the memory 270 to predict a user's movement location. For example, if the predicted location is a bedroom of the user as shown in FIG. 19B, the processor 290 may set a standby state of a device present in the bedroom to a second standby state. If the user detection signal is obtained from the device present in the bedroom as in step 1711 of FIG. 17, the processor 290 may provide information related to the bedroom to the device present in the bedroom. In this case, the information related to the bedroom may be humidity, temperature in the indoor area, tomorrow's weather, a schedule, or the like.

After information related to the bedroom such as the humidity and the temperature of the indoor area is provided as shown in FIG. 19B, if the user's movement is detected, the processor 290 may use the relational model or the probability model stored in the memory 270 to predict the user's movement location. For example, if the predicted location is a dressing room as shown in FIG. 19C, the processor 290 may set a standby state of a device present in the dressing room to the second standby state. The processor 290 may provide information related to the dressing room if the user detection signal is obtained from the device present in the dressing room. In this case, the information related to the dressing room may be fashion information suitable for tomorrow's weather and schedule information. The processor 290 may also transmit the fashion information to a portable device or a wearable device of the user.

Referring to FIGS. 20A, 20B, and 20C, if the information service providing signal obtained in step 1701 of FIG. 17 is a signal related to a wake-up call alarm of a portable device or a wearable device of a user, the processor 290 may provide the user's schedule such as "There is a meeting at 9 AM today" to a device present in a first location (e.g., a bedroom) as voice data.

After a schedule is provided as voice data as shown in FIG. 20B, if a user's movement is detected, the processor 290 may use a relational model or probability model stored in the memory 270 to predict a user's movement location. For example, if the predicted location is a powder room of the user as shown in FIG. 20B, the processor 290 may set a standby state of a device present in the powder room to the second standby state. If a user detection signal is obtained from the device present in the powder room, the processor 290 may provide the remaining time until the user's schedule as voice data such as "It is 30 minutes before the meeting. Hurry up."

After the remaining time until the user's schedule is provided as voice data as shown in FIG. 20B, if a user's movement is detected, the processor 290 may predict a user's movement location. For example, if the predicted location is an entrance in the indoor area as shown in FIG. 20C, the processor 290 may set a standby state of a device present in the entrance to the second standby state. If a user detection signal is obtained from the device present in the entrance, the processor 290 may provide information on preparation material or the like related to weather of the day as voice data such as "It will rain in the afternoon. Take your umbrella."

According to an embodiment, if the information service providing signal is not the signal for the history of remotely controlling the home appliance as in step 1703 of FIG. 17, the processor 290 may provide information related to a kitchen on a display of the device located in a first location (e.g., the kitchen). In this case, the information related to the kitchen may be food taken out of a refrigerator by the user, calories for the food taken out, calories consumed by the user, or the like. For this, the processor 290 may obtain image data of the food taken out of the refrigerator by the user from a device such a camera provided in the refrigerator. The processor 290 may confirm a type of food taken out of the refrigerator, the calories of the food, or the like by analyzing the obtained image data. In addition, the processor 290 may obtain information related to the food and calories consumed by the user on that day through communication with a wearable device of the user.

The processor 290 may obtain information related to the food and calories consumed by the user on that day to calculate the calories consumed by the user. The processor 290 may generate exercise information such as a type of exercise to be recommended to the user, an exercise time, or the like on a basis of the calculated calorie. If a user's movement is detected, the processor 290 may predict a user's movement location by using the relational model or the probability model stored in the memory 270. For example, if the predicted location is a living room, the processor 290 may set a standby state of a device present in the living room to a second standby state. If a user detection signal is obtained from the device present in the living room, the processor 290 may activate the device present in the living room and provide the generated exercise information. The processor 290 may obtain information on a user's exercise amount from a fitness device located in the living room. If it is detected that an operation of the fitness device stops, the processor 290 may determine that a user's exercise is finished. The processor 290 may generate result information on calories consumed by the user, exercise time, or the like on a basis of the obtained information on the exercise amount, and may provide the resulting information to a device present in the living room. In addition, the processor 290 may also provide the resulting information to a portable device or a wearable device of the user.

After the information service providing signal is provided, if a signal related to cancellation of executing a function corresponding to the information service providing signal is generated by a user, the processor 290 may stop providing the information service providing signal according to the function execution cancelling signal. In this case, the function execution cancelling signal may be generated by at least one of a remote controller provided in the electronic device 200, voice data of the user, the portable device and the wearable device of the user, and a gesture of the user.

Embodiments of the present disclosure and the accompanying drawings are presented only as a certain example for clarity and are not intended to limit the scope of the disclosure. That is, it is apparent to those of ordinary skill in the art to which the present disclosure pertains that modifications based on the present disclosure are possible.

As described above, an electronic device and a method of operating the electronic device of the present disclosure may predict a movement location of a user on a basis of a current location or a final location of the user and transmit an information service to at least one device present in the predicted movement location. Therefore, there is an advantage in that the user does not have to inconveniently operate an application to confirm the information service or move to confirm the information service.

While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:

1. A method of operating an electronic device, the method comprising:
    confirming a first location of a user;
    predicting a second location on a basis of the first location and a pre-stored at least one expected movement path confirmed by a relational model or a probability model; and
    providing an information service providing signal to at least one external device present in the second location,
    wherein the information service providing signal includes information related to an operational state of at least one external device present in an indoor area, and
    wherein the relational model is based on a positional relation between devices in which the user is detected and the probability model is based on a probability that the user may move from the first location to the final location.

2. The method of claim 1,
    wherein the electronic device further comprises a detection sensor, and
    wherein confirming the first location of the user comprises:
    confirming the first location according to a detection signal obtained from the detection sensor; and
    performing a function corresponding to the information service providing signal.

3. The method of claim 1, wherein confirming the first location of the user further comprises confirming at least one of a current location of the user and a final location at which the user is detected, according to sensing information received from at least one external device.

4. The method of claim 3, wherein confirming the first location further comprises setting a standby state of at least one external device present in the second location.

5. The method of claim 3, wherein the sensing information comprises sensing information based on an operation signal of the at least one external device, and sensing information detected from a detection sensor provided in the at least one external device.

6. The method of claim 1, wherein the information service providing signal comprises a remote control history for the at least one external device, a schedule of the user, and a movement state of the user.

7. The method of claim 6, wherein the schedule of the user is obtained from at least one of an input of the user and an external device carried by the user.

8. The method of claim 6, further comprising controlling a function of the at least one external device corresponding to the provided information service providing signal according to an input from the user.

9. The method of claim 8, further comprising outputting a control result to the display, wherein the electronic device further comprises a display.

10. The method of claim 3, wherein the pre-stored expected movement path is a path based on at least one of an expected movement path generated based on locations of the electronic device and the at least one external device and an expected movement path generated based on the user's movement.

11. An electronic device comprising:
    a memory configured to store at least one expected movement path; and
    a processor configured to confirm a first location of a user, predict a second location on a basis of the first location and a pre-stored at least one expected movement path confirmed by a relational model or a probability model, and provide an information service providing signal to at least one external device present in the second location,
    wherein the information service providing signal includes information related to an operational state of at least one external device present in an indoor area, and
    wherein the relational model is based on a positional relation between devices in which the user is detected and the probability model is based on a probability that the user may move from the first location to the final location.

12. The electronic device of claim 11, further comprising a detection sensor, wherein the processor is further configured to confirm the first location according to a detection signal obtained from the detection sensor, and perform a function corresponding to the information service providing signal.

13. The electronic device of claim 11, wherein the processor is further configured to conform at least one of a current location of the user and a final location at which the user is detected, according to sensing information received from at least one external device.

14. The electronic device of claim 13, wherein the processor is further configured to set a standby state of at least one external device present in the second location.

15. The electronic device of claim 13, wherein the sensing information comprises sensing information based on an operation signal of the at least one external device, and sensing information detected from the detection sensor provided in the at least one external device.

16. The electronic device of claim 11, wherein the information service providing signal comprises a remote control history for the external device, a schedule of the user, and a movement state of the user.

17. The electronic device of claim 16, wherein the schedule of the user is obtained from at least one of an input of the user and an external device carried by the user.

18. The electronic device of claim 16, wherein the processor is further configured to control a function of an external device corresponding to the information service providing signal according to an input from the user.

19. The electronic device of claim 18, further comprising a display, wherein the processor is further configured to output a control result to the display.

20. The electronic device of claim 13, wherein the pre-stored at least one expected movement path is a path based on at least one of an expected movement path generated based on locations of the electronic device and the at least one external device and an expected movement path generated based on the user's movement.

* * * * *